US010152055B2

(12) United States Patent
Naito et al.

(10) Patent No.: US 10,152,055 B2
(45) Date of Patent: Dec. 11, 2018

(54) DRONE, METHOD FOR CONTROLLING FLIGHT OF THE SAME, AND NON-TRANSITORY COMPUTER-READABLE RECORDING MEDIUM STORING PROGRAM

(71) Applicant: Panasonic Intellectual Property Corporation of America, Torrance, CA (US)

(72) Inventors: Eiichi Naito, Kyoto (JP); Takenobu Aoshima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 50 days.

(21) Appl. No.: 15/628,680

(22) Filed: Jun. 21, 2017

(65) Prior Publication Data

US 2017/0300050 A1 Oct. 19, 2017

Related U.S. Application Data

(63) Continuation of application No. PCT/JP2016/003252, filed on Jul. 8, 2016.
(Continued)

(30) Foreign Application Priority Data

Dec. 28, 2015 (JP) .................................. 2015-256741
Jun. 27, 2016 (JP) .................................. 2016-126149

(51) Int. Cl.
*G05D 1/00* (2006.01)
*B64C 39/02* (2006.01)
(Continued)

(52) U.S. Cl.
CPC ......... *G05D 1/0033* (2013.01); *B64C 39/024* (2013.01); *G05D 1/0088* (2013.01);
(Continued)

(58) Field of Classification Search
CPC .... B64C 39/024; G08G 5/0069; G08G 5/006; G05D 1/101; G05D 1/0088
See application file for complete search history.

(56) References Cited

U.S. PATENT DOCUMENTS 9,317,036 B2 * 4/2016 Wang .................. G05D 1/0214
2016/0291588 A1 * 10/2016 Ashoori ................ G01S 19/13

FOREIGN PATENT DOCUMENTS

JP 7-178235 7/1995

OTHER PUBLICATIONS

International Search Report of PCT application No. PCT/JP2016/003252 dated Sep. 20, 2016.

* cited by examiner

*Primary Examiner* — Todd M Melton
(74) *Attorney, Agent, or Firm* — Greenblum & Bernstein, P.L.C.

(57) ABSTRACT

A drone, a method for controlling the flight of a drone, and a program for controlling the flight of a drone capable of preventing the drone from flying into a place where it is difficult for an operator to visually observe the drone and flying the drone within an area in which the operator can visually observe the drone are provided. A control unit of the drone determines whether an illuminance detected by an illuminance sensor satisfies a required illuminance for the drone to fly, and if the detected illuminance does not satisfy the required illuminance, inhibits the drone from flying in the flight direction.

8 Claims, 32 Drawing Sheets

Related U.S. Application Data

(60) Provisional application No. 62/201,773, filed on Aug. 6, 2015.

(51) Int. Cl.
*G08G 5/00* (2006.01)
*G05D 1/10* (2006.01)
*G08G 5/04* (2006.01)

(52) U.S. Cl.
CPC .............. *G05D 1/101* (2013.01); *G08G 5/006* (2013.01); *G08G 5/0021* (2013.01); *G08G 5/0039* (2013.01); *G08G 5/0052* (2013.01); *G08G 5/0069* (2013.01); *G08G 5/045* (2013.01); *B64C 2201/146* (2013.01)

FIG. 18

| POSITION |
|----------|
| (x0, y0, z0) |

FIG. 23

| POSITION |
|---|
| (x0, y0, z0) |
| (x1, y1, z1) |
| (x2, y2, z2) |
| ⋮ |

FIG. 27

| POSITION | FLIGHT IMPOSSIBLE DIRECTION |
|---|---|
| (x1, y1, z1) | 0° |
| (x2, y2, z2) | 270° |
| ⋮ | ⋮ |

DRONE, METHOD FOR CONTROLLING FLIGHT OF THE SAME, AND NON-TRANSITORY COMPUTER-READABLE RECORDING MEDIUM STORING PROGRAM

BACKGROUND

1. Technical Field

The present disclosure relates to a remotely controlled drone, a method for controlling the flight of a remotely controlled drone, and a program for controlling the flight of a remotely controlled drone.

2. Description of the Related Art

During these years, small drones remotely controlled by operators using remote controllers are gaining in popularity. Such drones can freely fly through the air (e.g., Japanese Unexamined Patent Application Publication No. 7-178235).

Since drones can freely fly through the air, various regulations on the flight of drones are being examined. For example, a regulation for limiting the flight of drones to areas in which operators can visually observe the drones is being examined.

SUMMARY

The above example of the related art, however, requires further improvements.

In one general aspect, the techniques disclosed here feature a drone including a detector that detects an illuminance in a flight direction of the drone, a communicator that communicates with a controller used to remotely control the drone, a driver that flies the drone, and circuitry that, in operation, performs operations including determining whether the detected illuminance satisfies an illuminance requirement for the drone to fly, and inhibiting, if the detected illuminance does not satisfy the illuminance requirement, the drone from flying in the flight direction.

According to the present disclosure, if an illuminance in a flight direction of a drone does not satisfy a required illuminance for the drone to fly, the drone is inhibited from flying in the flight direction. As a result, it becomes possible to prevent the drone from flying into a place where it is difficult for an operator to visually observe the drone and fly the drone within an area in which the operator can visually observe the drone.

It should be noted that general or specific aspects may be implemented as an apparatus, a system, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 is a diagram illustrating an example of flight start position information stored in a flight start position storage section;

FIG. 23 is a diagram illustrating an example of flight route information stored in a flight route storage section;

FIG. 27 is a diagram illustrating an example of flight impossible directions stored in a flight impossible direction storage section;

DETAILED DESCRIPTION

Figure 1:
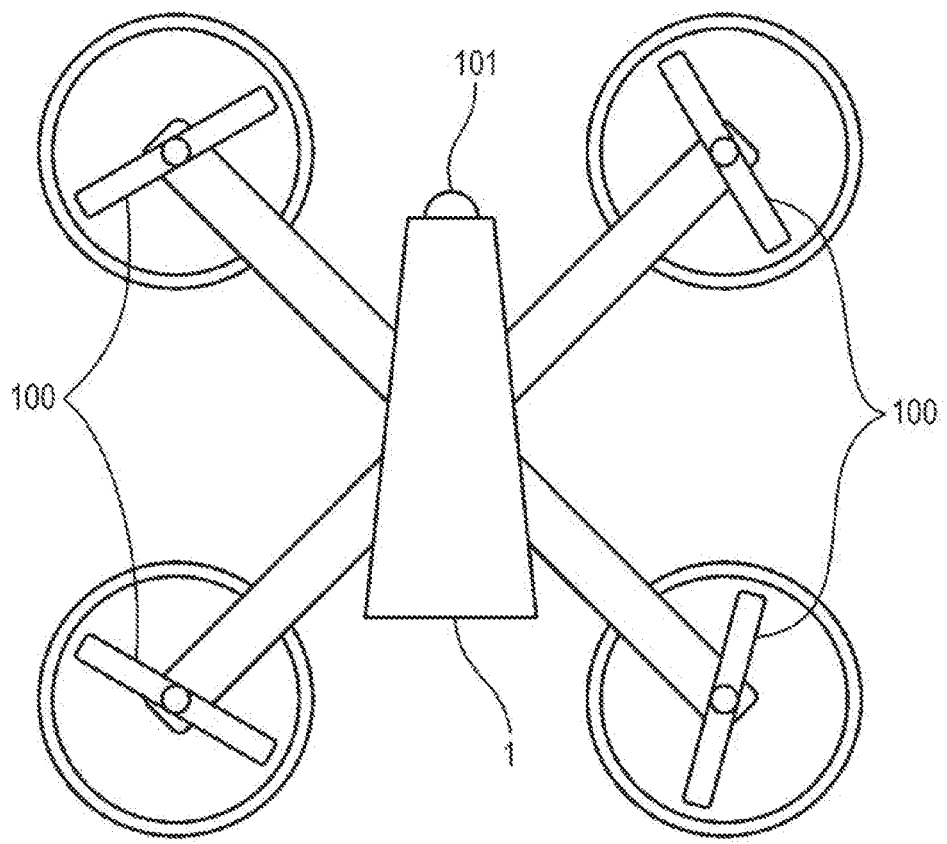
FIG. 1 is a plan view of a drone according to a first embodiment of the present disclosure.

Underlying Knowledge Forming Basis of Present Disclosure

Since drones can freely fly through the air, various regulations on the flight of drones are being examined. For example, a regulation for limiting the flight of drones to areas in which operators can visually observe the drones is being examined.

It is currently left up to operators, however, whether to fly drones into places where it is difficult for the operators to visually observe the drones, such as structures including buildings and tunnels, and caves.

A drone according to an aspect of the present disclosure is a drone including a detector that detects an illuminance in a flight direction of the drone, a communicator that communicates with a controller used to remotely control the drone, a driver that flies the drone, and circuitry that, in operation, performs operations including determining whether the detected illuminance satisfies an illuminance requirement for the drone to fly, and inhibiting, if the detected illuminance does not satisfy the illuminance requirement, the drone from flying in the flight direction.

With this configuration, the illuminance in the flight direction of the drone is detected. It is determined whether the detected illuminance satisfies the illuminance requirement for the drone to fly. If the detected illuminance does not satisfy the illuminance requirement, the drone is inhibited from flying in the flight direction.

If the illuminance in the flight direction of the drone does not satisfy the illuminance requirement for the drone to fly, therefore, the drone is inhibited from flying in the flight direction. As a result, it becomes possible to prevent the drone from flying into a place where it is difficult for the operator to visually observe the drone and fly the drone within an area in which the operator can visually observe the drone.

In addition, in the drone, the operations may further include flying, if the detected illuminance does not satisfy the illuminance requirement, the drone in a direction different from the flight direction.

With this configuration, if the detected illuminance does not satisfy the illuminance requirement, the drone flies in a direction different from the flight direction. As a result, it becomes possible to prevent the drone from flying into a place where it is difficult for the operator to visually observe the drone.

In addition, the drone may further include a storage that stores a flight start position, which indicates a position at which the drone started to fly. The operations may further include flying, if the detected illuminance does not satisfy the illuminance requirement, the drone to the flight start position stored in the storage to return the drone to the flight start position.

With this configuration, the flight start position, which indicates the position at which the drone started to fly, is stored in the storage. If the detected illuminance does not satisfy the illuminance requirement, the drone flies to the flight start position stored in the storage to return to the flight start position.

If the operator tries to fly the drone into a place where it is difficult for the operator to visually observe the drone, therefore, the drone returns to the flight start position.

In addition, the drone may further include a storage. The operations may further include obtaining, if the detected illuminance does not satisfy the illuminance requirement, a current position of the drone, storing, as a flight impossible direction, the flight direction at the obtained current position in the storage while associating the flight direction with positional information indicating the obtained current position, and inhibiting the drone from flying into a certain flight prohibition area including the flight impossible direction at the position indicated by the positional information stored in the storage.

With this configuration, if the detected illuminance does not satisfy the illuminance requirement, the current position of the drone is obtained and stored. The flight direction at the obtained current position is associated with the positional information indicating the obtained current position and stored in the storage as a flight impossible direction. The drone is inhibited from flying into a certain flight prohibition area including the flight impossible direction at the position indicated by the positional information stored in the storage.

If the detected illuminance does not satisfy the illuminance requirement, therefore, the flight direction at the obtained current position is associated with the positional information indicating the obtained current position and stored as the flight impossible direction, and the drone is inhibited from flying into the certain flight prohibition area including the flight impossible direction. As a result, it can be determined whether the drone can fly in the flight direction using the stored flight impossible direction without detecting the illuminance in the flight direction.

In addition, in the drone, the operations may further include transmitting, if the detected illuminance does not satisfy the illuminance requirement, notification information indicating that the drone does not fly in the flight direction to the controller.

With this configuration, if the detected illuminance does not satisfy the illuminance requirement, the notification information indicating that the drone does not fly in the flight direction is transmitted to the controller. As a result, the operator is notified that the drone does not fly in the flight direction.

In addition, in the drone, the operations may further include allowing, if there is the flight prohibition area in all directions of the drone at the position indicated by the positional information stored in the storage, the drone to fly through remote control performed by an operator.

With this configuration, if there is the flight prohibition area in all the directions of the drone at the position indicated by the positional information stored in the storage, the drone is allowed to fly through the remote control performed by the operator. As a result, it becomes possible to prevent the drone from being stuck even if it is difficult for the operator to visually observe the drone.

A method for controlling flight of a drone according to another aspect of the present disclosure includes detecting an illuminance in a flight direction of the drone using an illuminance sensor included in the drone, determining whether the detected illuminance satisfies an illuminance requirement for the drone to fly, and inhibiting, if the detected illuminance does not satisfy the illuminance requirement, the drone from flying in the flight direction.

With this configuration, the illuminance in the flight direction of the drone is detected. It is determined whether the detected illuminance satisfies the illuminance requirement for the drone to fly. If the detected illuminance does not satisfy the illuminance requirement, the drone is inhibited from flying in the flight direction.

If the illuminance in the flight direction of the drone does not satisfy the illuminance requirement for the drone to fly, therefore, the drone is inhibited from flying in the flight direction. As a result, it becomes possible to prevent the drone from flying into a place where it is difficult for the operator to visually observe the drone and fly the drone within an area in which the operator can visually observe the drone.

A non-transitory computer-readable recording medium storing a program for controlling flight of a drone according to another aspect of the present disclosure is a non-transitory computer-readable recording medium storing a program for controlling flight of a drone, the program causing a computer to perform a method including determining whether an illuminance in a flight direction of the drone satisfies an illuminance requirement for the drone to fly, and inhibiting, if the detected illuminance does not satisfy the illuminance requirement, the drone from flying in the flight direction.

With this configuration, it is determined whether the illuminance in the flight direction of the drone satisfies the illuminance requirement for the drone to fly. If the detected illuminance does not satisfy the illuminance requirement, the drone is inhibited from flying in the flight direction.

If the illuminance in the flight direction of the drone does not satisfy the illuminance requirement for the drone to fly, therefore, the drone is inhibited from flying in the flight direction. As a result, it becomes possible to prevent the drone from flying into a place where it is difficult for the operator to visually observe the drone and fly the drone within an area in which the operator can visually observe the drone.

Embodiments of the present disclosure will be described hereinafter with reference to the accompanying drawings. The following embodiments are specific examples of the present disclosure and do not limit the technical scope of the present disclosure.

First Embodiment

FIG. 1 is a plan view of a drone according to a first embodiment of the present disclosure.

A drone 1 illustrated in FIG. 1 is remotely controlled by an operator using a controller. The drone 1 includes a plurality of propellers 100 and can freely fly through the air. In the present embodiment, the drone 1 includes four propellers 100, but the number of propellers 100 in the present disclosure is not particularly limited to this. The drone 1 may include eight propellers, instead.

An illuminance sensor 101 is provided on a front surface of the drone 1. The illuminance sensor 101 is a phototransistor or a photodiode, for example, and detects an illuminance in a flight direction of the drone 1. A position at which the illuminance sensor 101 is provided is not limited to the front surface of the drone 1, and may be anywhere on the drone 1 insofar as the illuminance sensor 101 can detect the illuminance in the flight direction of the drone 1. Since the drone 1 can fly in any direction, an illuminance sensor 101 capable of detecting illuminances in all directions may be used, instead. The illuminance sensor 101 may include a plurality of illuminance sensors 101 in order to detect the illuminances in all directions.

Figure 2:
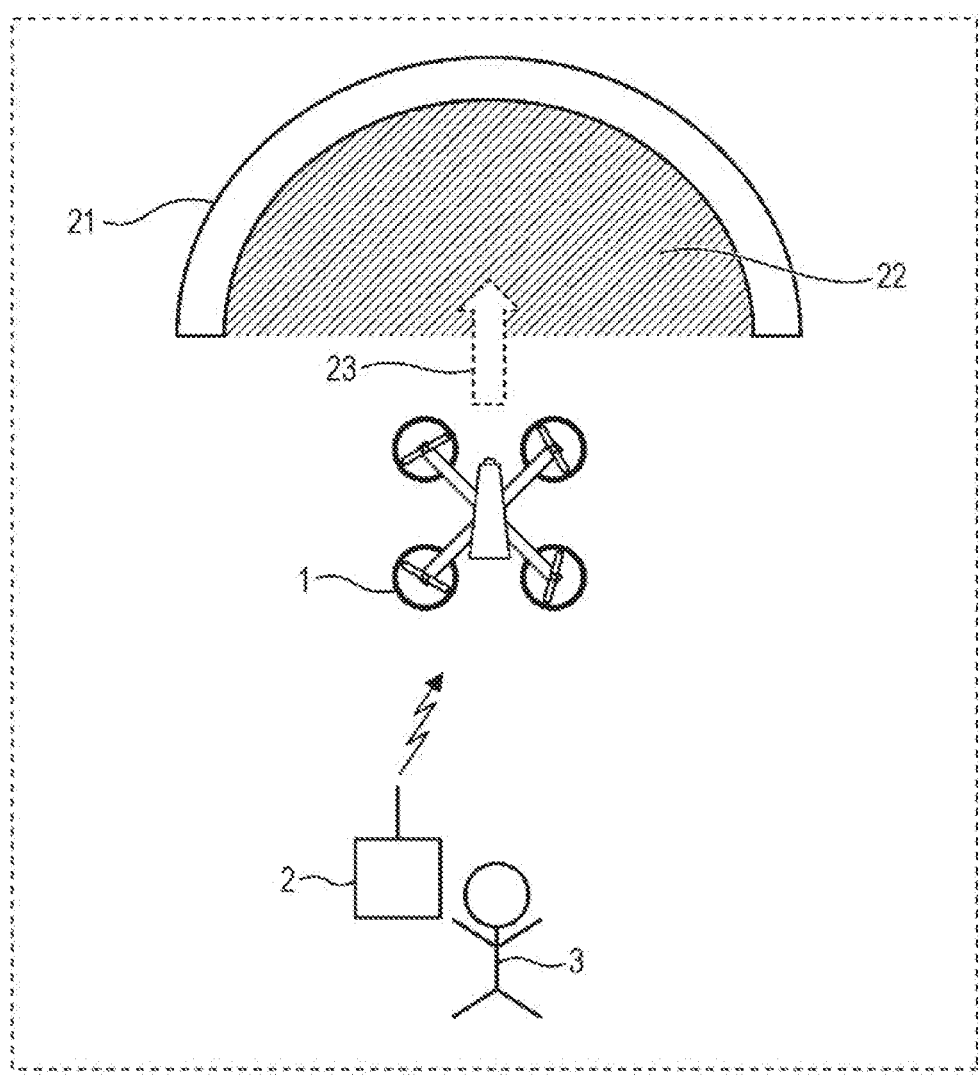
FIG. 2 is a schematic diagram illustrating the operation of the drone according to the first embodiment.

FIG. 2 is a schematic diagram strating the operation of the drone 1 according to the first embodiment.

As illustrated in FIG. 2, an operator 3 remotely controls the drone 1 using a controller 2. The drone 1 can be controlled only within an area in which the operator 3 can visually observe the drone 1. If the drone 1 flies to an inside 22 of a structure 21 such as a building or a tunnel, however, the operator 3 might not be able to visually observe the drone 1.

In the first embodiment, the illuminance sensor 101 on the drone 1 detects the illuminance in a flight direction 23 of the drone 1, and if the detected illuminance does not satisfy a required illuminance for the drone 1 to fly, the drone 1 is inhibited from flying in the flight direction 23.

Figure 3:
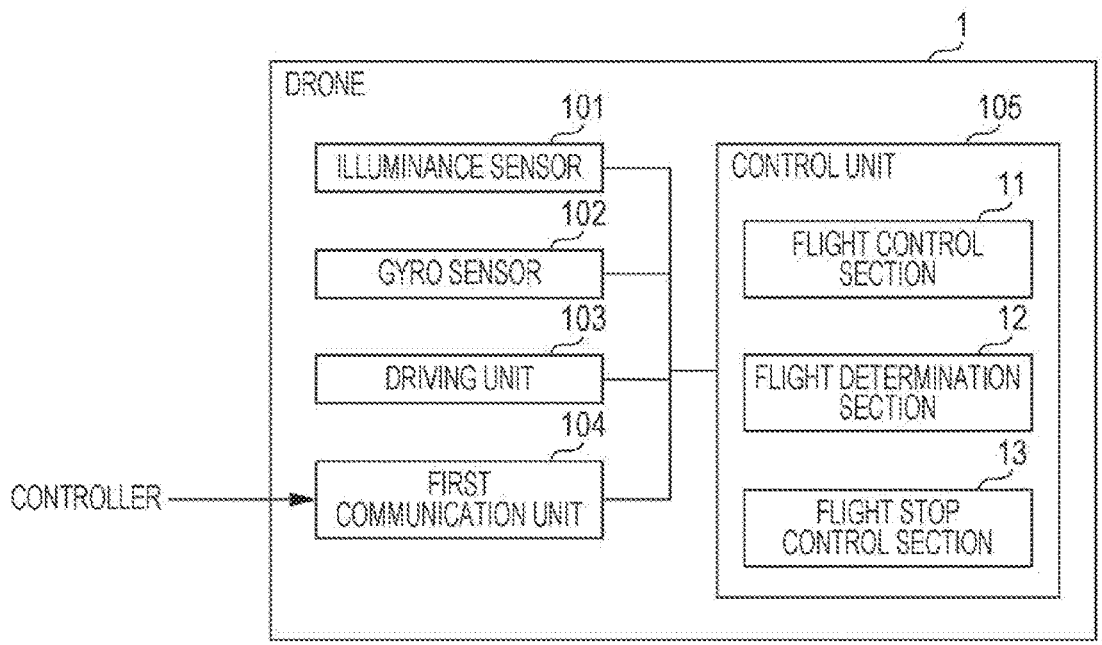
FIG. 3 is a block diagram illustrating the configuration of the drone according to the first embodiment of the present disclosure.

FIG. 3 is a block diagram illustrating the configuration of the drone 1 according to the first embodiment of the present disclosure. The drone 1 illustrated in FIG. 3 includes the illuminance sensor 101, a gyro sensor 102, a driving unit 103, a first communication unit 104, and a control unit 105.

The illuminance sensor 101 detects the illuminance in the flight direction of the drone 1. The gyro sensor 102 detects an angle, angular speed, or angular acceleration of the drone 1. The driving unit 103 drives the plurality of propellers 100, that is, the driving unit 103 rotates the plurality of propellers 100 to fly the drone 1. The first communication unit 104 wirelessly receives, from the controller 2, control information for controlling the drone 1.

The control unit 105 is a central processing unit (CPU), for example, and controls the operation of the drone 1, The control unit 105 includes a flight control section 11, a flight determination section 12, and a flight stop control section 13.

The flight control section 11 controls the flight of the drone 1, which is remotely controlled by the operator 3. The flight control section 11 controls the flight of the drone 1 in accordance with the control information received by the first communication unit 104. The flight control section 11 also controls an attitude of the drone 1 on the basis of the angle, the angular speed, or the angular acceleration detected by the gyro sensor 102.

The flight determination section 12 determines whether the illuminance detected by the illuminance sensor 101 satisfies the required illuminance for the drone 1 to fly. The required illuminance is an illuminance with which the operator 3 can visually observe the drone 1. The flight determination section 12 determines whether the illuminance detected by the illuminance sensor 101 is equal to or higher than the required illuminance for the drone 1 to fly.

If the flight determination section 12 determines that the detected illuminance does not satisfy the required illuminance, the flight stop control section 13 inhibits the drone 1 from flying in the flight direction and causes the drone 1 to hover (stop) at a current position. That is, the flight stop control section 13 does not accept an instruction to fly the drone 1 in the flight direction to invalidate the instruction.

Figure 4:
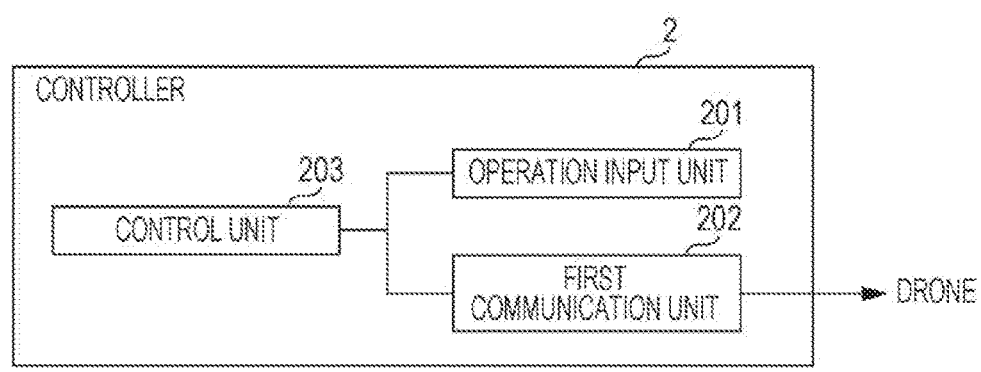
FIG. 4 is a block diagram illustrating the configuration of a controller according to the first embodiment of the present disclosure.

FIG. 4 is a block diagram illustrating the configuration of the controller 2 according to the first embodiment of the present disclosure. The controller 2 illustrated in FIG. 4 includes an operation input unit 201, a first communication unit 202, and a control unit 203.

The operation input unit 201 receives operations performed by the operator 3. The operation input unit 201 includes, for example, a left stick used by the left hand of the operator 3 and a right stick used by the right hand of the operator 3. When the operator 3 moves the left and right sticks, the operation input unit 201 outputs angular information regarding inclination angles to the control unit 203. The flight of the drone 1 is controlled in accordance with the inclination angles. The control information includes, for example, the angular information indicating the inclination angles of the left and right sticks.

The first communication unit 202 wirelessly transmits the control information to the drone 1.

The control unit 203 is a CPU, for example, and controls the operation of the controller 2. The control unit 203 outputs the control information to the first communication unit 202.

Next, a process for controlling the flight of the drone 1 according to the first embodiment will be described.

Figure 5:
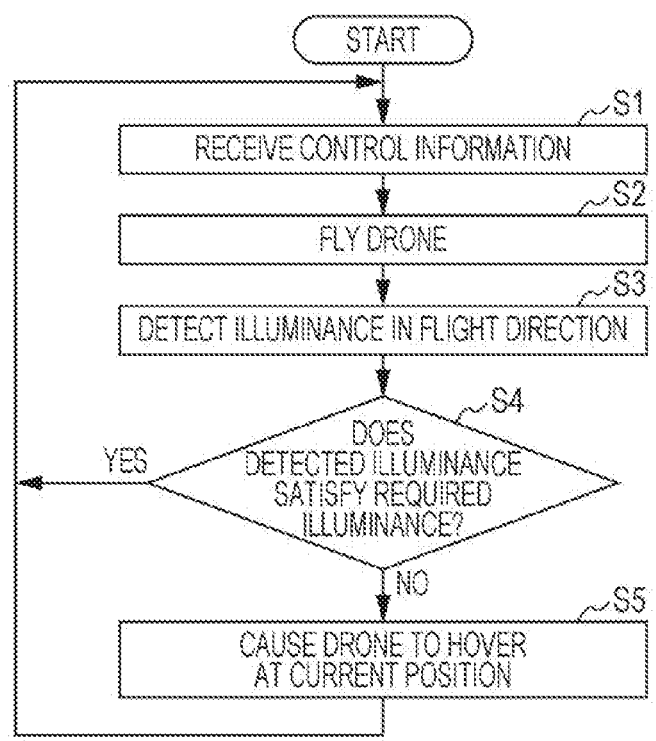
FIG. 5 is a flowchart illustrating a process for controlling the flight of a drone according to the first embodiment.

FIG. 5 is a flowchart illustrating the process for controlling the flight of the drone 1 according to the first embodiment.

First, in step S1, the first communication unit 104 receives control information transmitted from the controller 2.

Next, in step S2, the flight control section 11 flies the drone 1 in accordance with the control information received by the first communication unit 104.

Next, in step S3, the illuminance sensor 101 detects the illuminance in the flight direction of the drone 1, Next, in step S4, the flight determination section 12 determines whether the illuminance detected by the illuminance sensor 101 satisfies the required illuminance for the drone 1 to fly. If the detected illuminance satisfies the required illuminance (YES in step S4), the process returns to step S1.

If the detected illuminance does not satisfy the required illuminance (NO in step S4), on the other hand, the flight stop control section 13, in step S5, causes the drone 1 to hover at the current position, and the process returns to step S1.

As described above, in the first embodiment, if a detected illuminance in the flight direction of the drone 1 does not satisfy the required illuminance, the drone 1 is inhibited from flying in the flight direction. As a result, it becomes possible to prevent the drone 1 from flying into a place where it is difficult for the operator 3 to visually observe the drone 1 and fly the drone 1 within an area in which the operator 3 can visually observe the drone 1.

Figure 6:
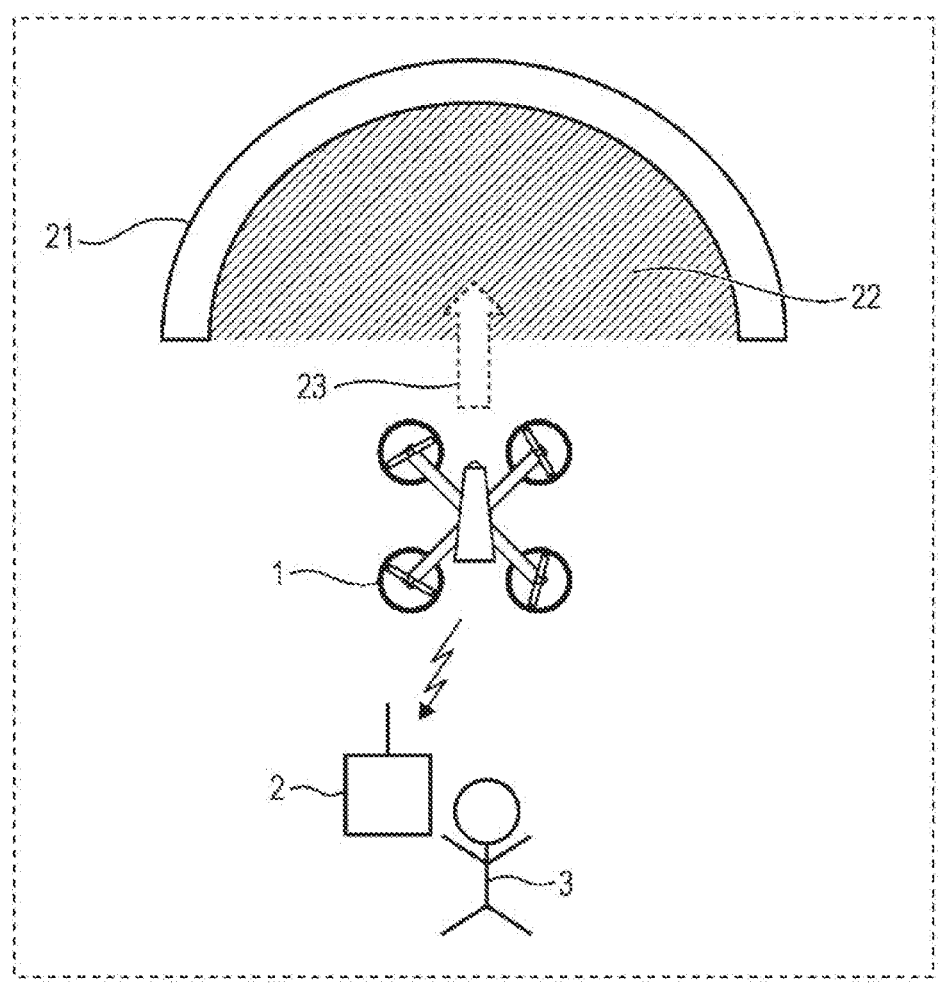
FIG. 6 is a schematic diagram illustrating the operation of a drone according to a second embodiment.

For example, the required illuminance may be 3 lux, with which the behavior and a posture of a person 4 meters ahead can be discerned, Second Embodiment FIG. 6 is a schematic diagram illustrating the operation of a drone 1 according to a second embodiment.

In the second embodiment, if an illuminance in the flight direction 23 of the drone 1 detected by the illuminance sensor 101 on the drone 1 does not satisfy the required illuminance for the drone 1 to fly, the drone 1 is inhibited from flying in the flight direction 23. In addition, in the second embodiment of the present disclosure, if the detected illuminance does not satisfy the required illuminance, notification information indicating that the drone 1 does not fly in the flight direction 23 is transmitted to the controller 2 used by the operator 3.

The controller 2 may be, for example, a smartphone, a tablet computer, or a personal computer, instead.

Figure 7:
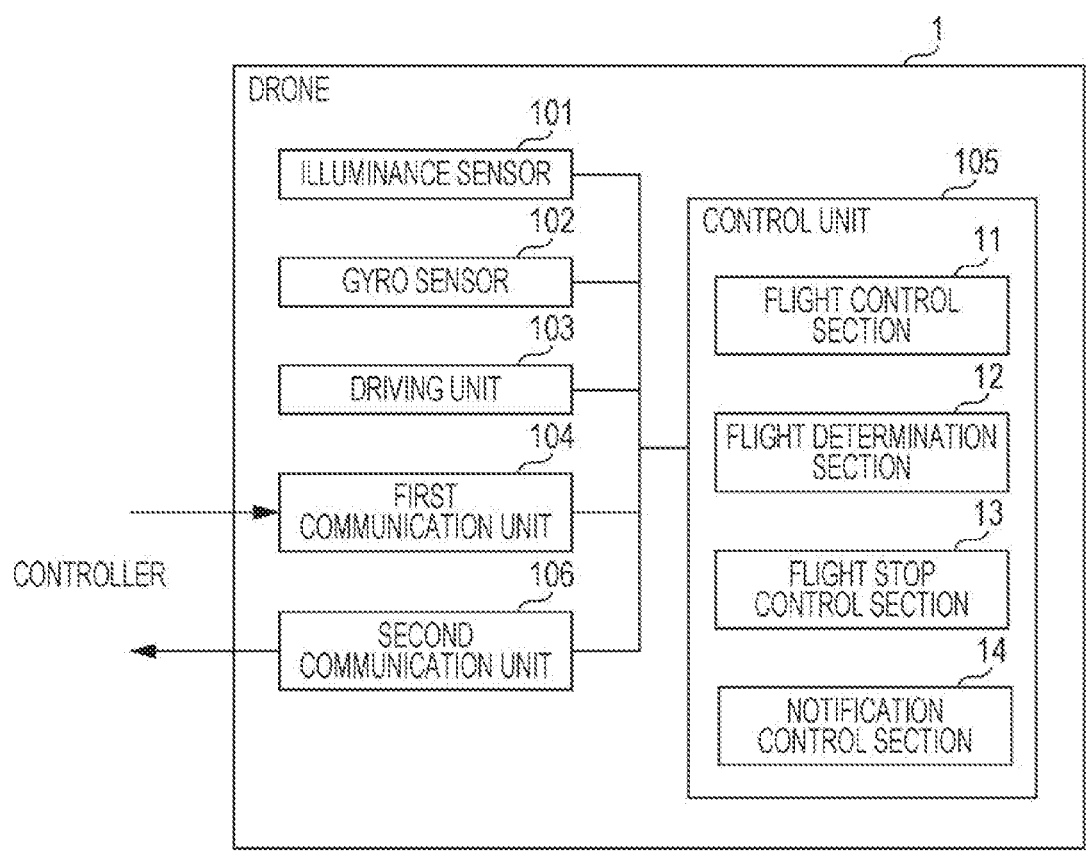
FIG. 7 is a block diagram illustrating the configuration of the drone according to the second embodiment of the present disclosure.

FIG. 7 is a block diagram illustrating the configuration of the drone 1 according to the second embodiment of the present disclosure. The drone 1 illustrated in FIG. 7 includes the illuminance sensor 101, the gyro sensor 102, the driving unit 103, the first communication unit 104, the control unit 105, and a second communication unit 106. The same components of the drone 1 according to the second embodiment illustrated in FIG. 7 as those of the drone 1 illustrated in FIG. 3 are given the same reference numerals, and description thereof is omitted.

The control unit 105 includes the flight control section 11, the flight determination section 12, the flight stop control section 13, and a notification control section 14.

If the flight determination section 12 determines that a detected illuminance does not satisfy the required illuminance, the notification control section 14 generates the notification information indicating that the drone 1 does not fly in the flight direction. The notification control section 14 outputs the generated notification information to the second communication unit 106, The second communication unit 106 wirelessly transmits the notification information generated by the notification control section 14 to the controller 2.

Figure 8:
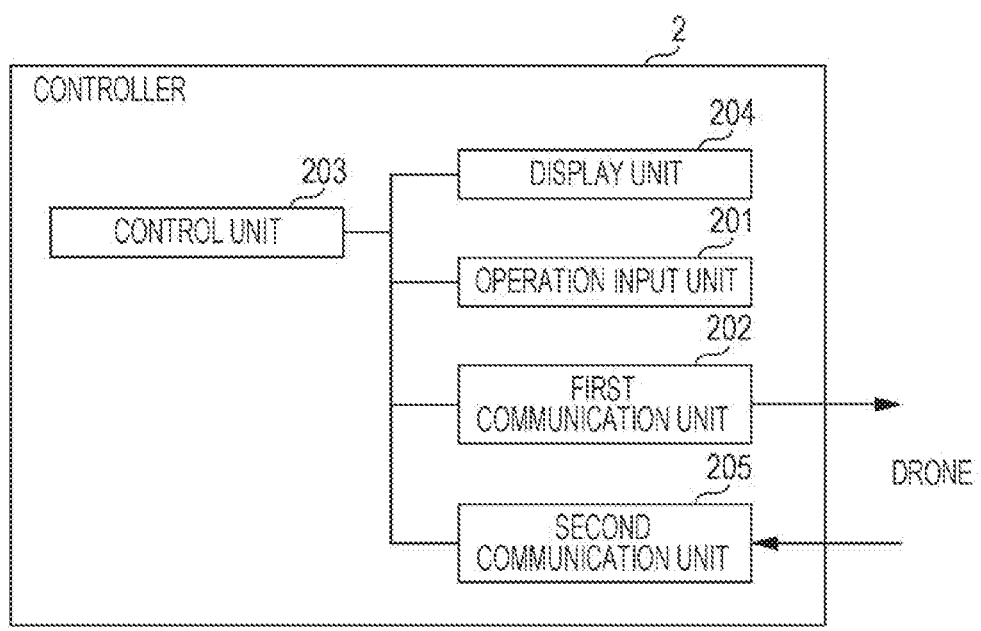
FIG. 8 is a block diagram illustrating the configuration of a controller according to the second embodiment of the present disclosure.

FIG. 8 is a block diagram illustrating the configuration of the controller 2 according to the second embodiment of the present disclosure. The controller 2 illustrated in FIG. 8 includes the operation input unit 201, the first communication unit 202, the control unit 203, a display unit 204, and a second communication unit 205, The same components of the controller 2 according to the second embodiment illustrated in FIG. 7 as those of the controller 2 illustrated in FIG. 4 are given the same reference numerals, and description thereof is omitted.

The second communication unit 205 receives notification information transmitted from the drone 1. The display unit 204 displays the notification information received by the second communication unit 205.

Next, a process for controlling the flight of the drone 1 according to the second embodiment will be described.

Figure 9:
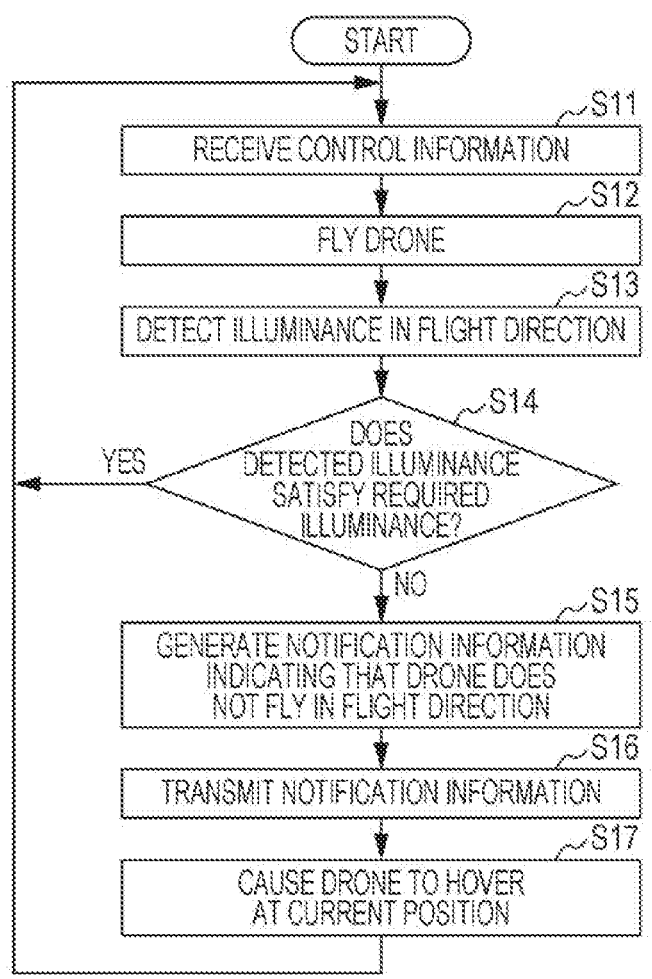
FIG. 9 is a flowchart illustrating a process for controlling the flight of a drone according to the second embodiment.

FIG. 9 is a flowchart illustrating the process for controlling the flight of the drone 1 according to the second embodiment.

Steps S11 to S14 are the same as steps S1 to S4, respectively, illustrated in FIG. 5, and description thereof is omitted, If a detected illuminance does not satisfy the required illuminance (NO in step S14), the notification control section 14, in step S15, generates notification information indicating that the drone 1 does not fly in the flight direction.

Next, in step S16, the second communication unit 106 transmits the notification information generated by the notification control section 14 to the controller 2.

Next, in step S17, the flight stop control section 13 causes the drone 1 to hover at the current position, and the process returns to step S11.

Figure 10:
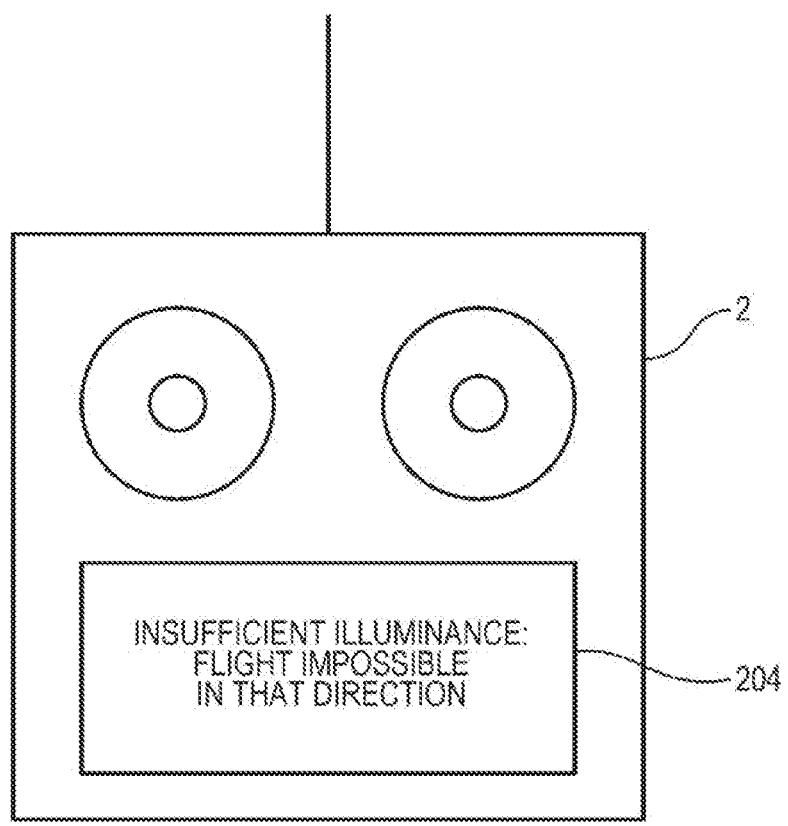
FIG. 10 is a diagram illustrating an example of a screen displayed on the controller according to the second embodiment of the present disclosure.

FIG. 10 is a diagram illustrating an example of a screen displayed on the controller 2 according to the second embodiment of the present disclosure. The second communication unit 205 of the controller 2 receives notification information transmitted from the drone 1. The display unit 204 displays the notification information received by the second communication unit 205.

As illustrated in FIG. 10, the display unit 204 displays notification information, "Insufficient illuminance: Flight impossible in that direction".

As described above, in the second embodiment, if a detected illuminance in the flight direction of the drone 1 does not satisfy the required illuminance, the notification information indicating that the drone 1 does not fly in the flight direction is transmitted to the controller 2, As a result, the operator 3 is notified that the drone 1 does not fly in the flight direction.

After notifying the operator 3 that the drone 1 does not fly in the flight direction, the drone 1 may return to the operator 3.

Third Embodiment

Figure 11:
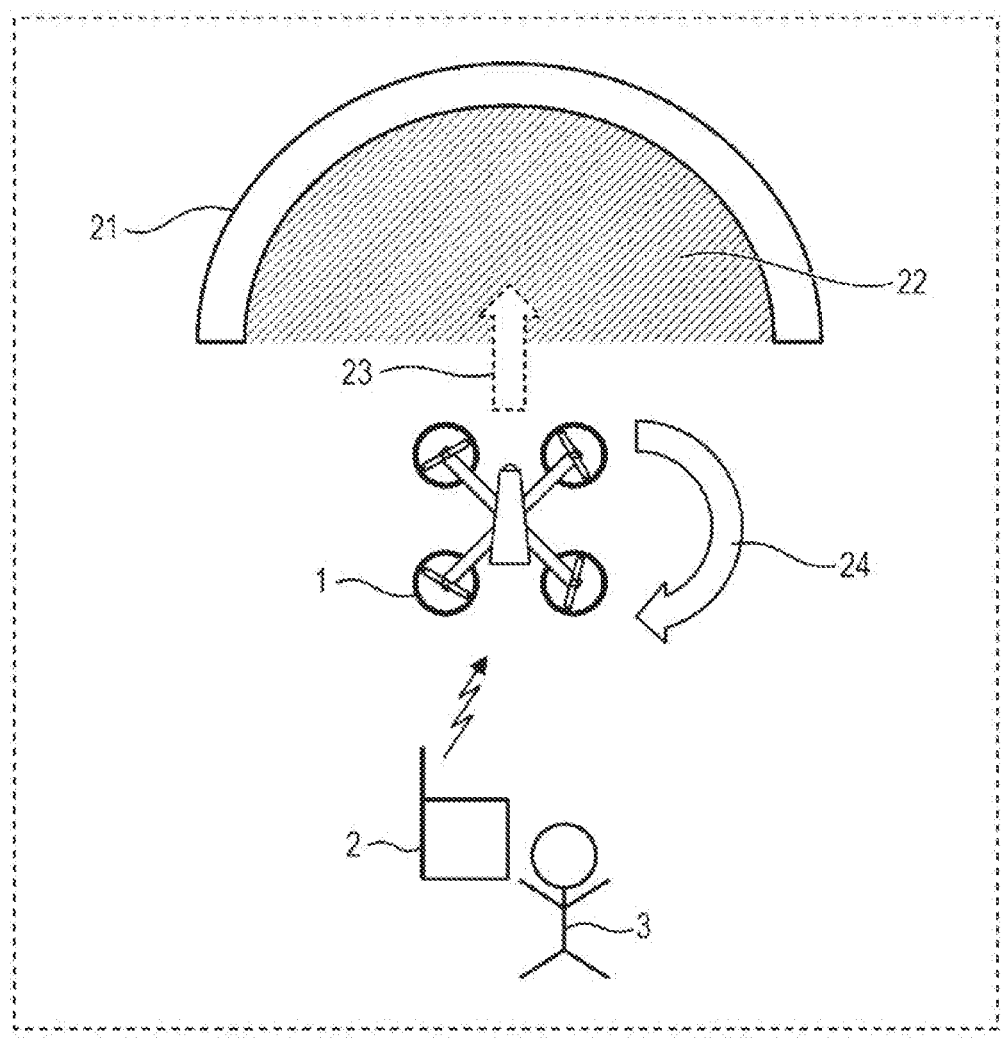
FIG. 11 is a schematic diagram illustrating the operation of a drone according to a third embodiment.

FIG. 11 is a schematic diagram illustrating the operation of a drone 1 according to a third embodiment.

In the third embodiment, if an illuminance in the flight direction of the drone 1 detected by the illuminance sensor 101 on the drone 1 does not satisfy the required illuminance for the drone 1 to fly, the drone 1 is inhibited from flying in the flight direction. In addition, in the third embodiment, if the detected illuminance does not satisfy the required illuminance, the drone 1 flies in a direction different from the flight direction.

As illustrated in FIG. 11, if a detected illuminance does not satisfy the required illuminance, the drone 1 automatically turns around in a direction indicated by an arrow 24.

Figure 12:
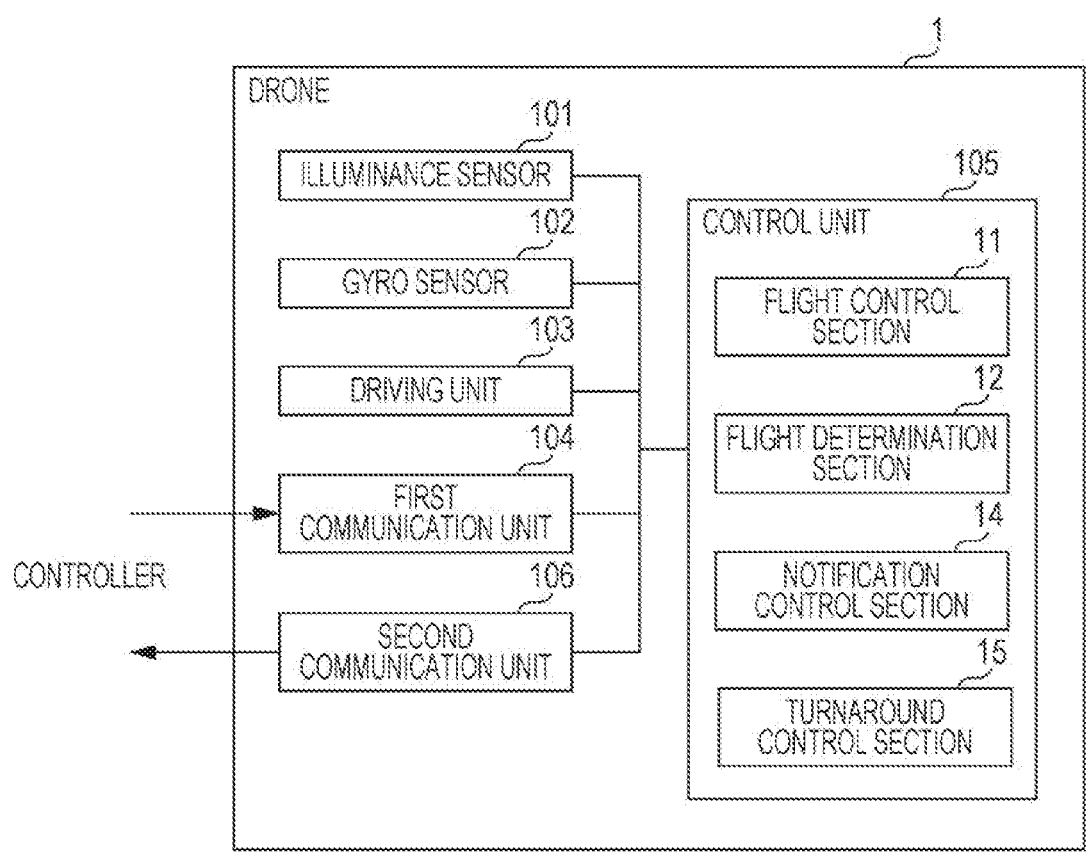
FIG. 12 is a block diagram illustrating the configuration of the drone according to the third embodiment of the present disclosure.

FIG. 12 is a block diagram illustrating the configuration of the drone 1 according to the third embodiment of the present disclosure. The drone 1 illustrated in FIG. 12 includes the illuminance sensor 101, the gyro sensor 102, the driving unit 103, the first communication unit 104, the control unit 105, and the second communication unit 106. The same components of the drone 1 according to the third embodiment illustrated in FIG. 12 as those of the drone 1 illustrated in FIG. 3 or 7 are given the same reference numerals, and description thereof is omitted.

The control unit 105 includes the flight control section 11, the flight determination section 12, the notification control section 14, and a turnaround control section 15.

If the flight determination section 12 determines that a detected illuminance does not satisfy the required illuminance, the notification control section 14 generates notification information indicating that the drone 1 is to automatically turn around. The notification control section 14 outputs the generated notification information to the second communication unit 106.

The second communication unit 106 wirelessly transmits the notification information generated by the notification control section 14 to the controller 2.

If the flight determination section 12 determines that a detected illuminance does not satisfy the required illuminance, the turnaround control section 15 automatically turns the drone 1 around.

The configuration of the controller 2 according to the third embodiment is the same as that of the controller 2 according to the second embodiment illustrated in FIG. 8, and description thereof is omitted.

Next, a process for controlling the flight of the drone 1 according to the third embodiment will be described.

Figure 13:
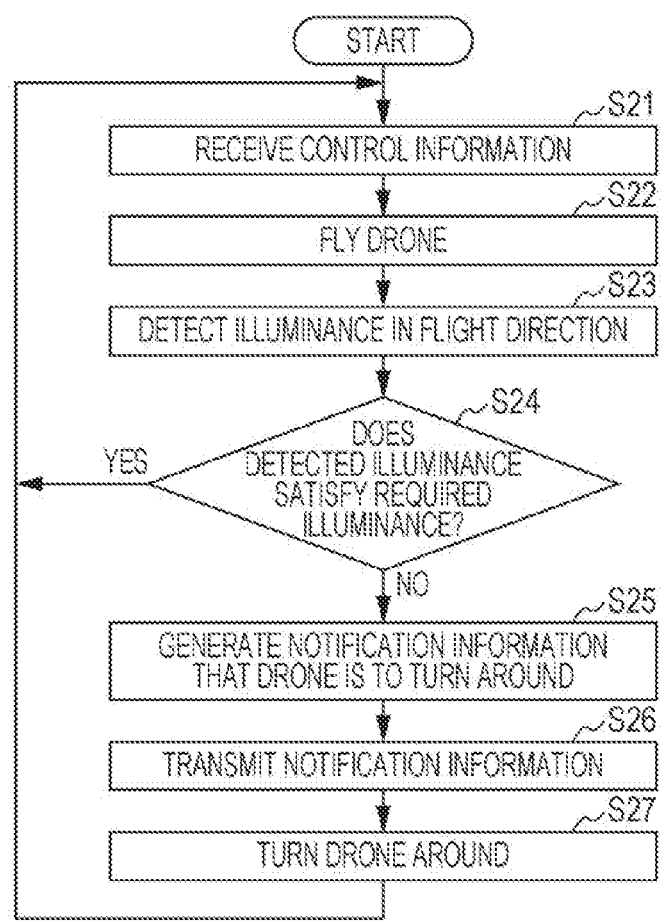
FIG. 13 is a flowchart illustrating a process for controlling the flight of a drone according to the third embodiment.

FIG. 13 is a flowchart illustrating the process for controlling the flight of the drone 1 according to the third embodiment.

Steps S21 to S24 are the same as steps S1 to S4, respectively, illustrated in FIG. 5, and description thereof is omitted.

If a detected illuminance does not satisfy the required illuminance (NO in step S24), the notification control section 14, in step S25, generates notification information indicating that the drone 1 is to turn around.

Next, in step S26, the second communication unit 106 transmits the notification information generated by the notification control section 14 to the controller 2.

Next, in step S27, the turnaround control section 15 automatically turns the drone 1 around. After automatically turning the drone 1 around, the turnaround control section 15 may cause the drone 1 to hover at the current position or fly the drone 1.

Figure 14:
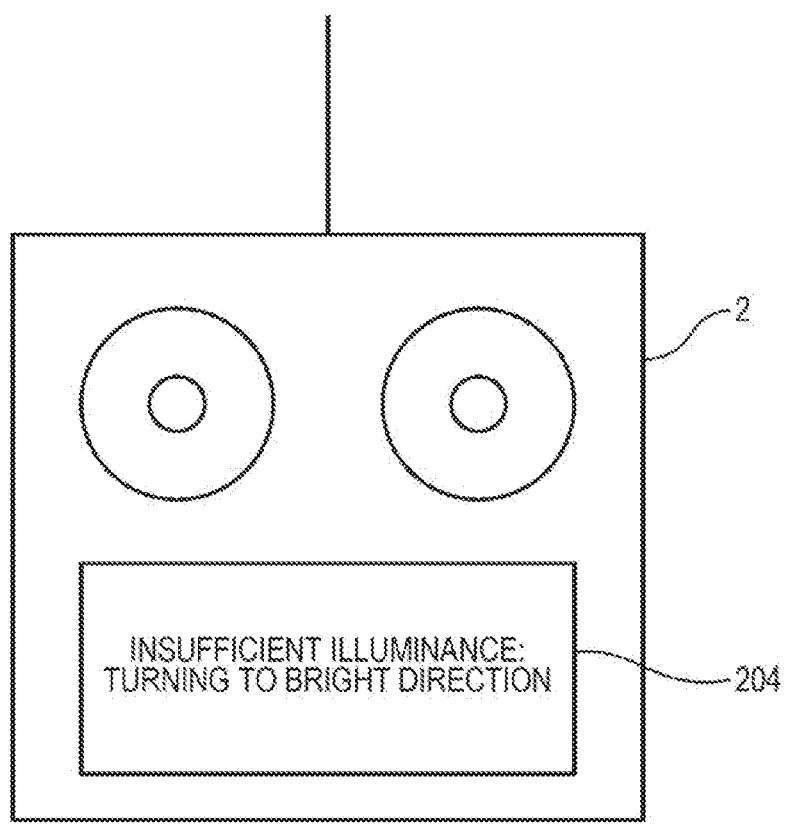
FIG. 14 is a diagram illustrating an example of a screen displayed on a controller according to the third embodiment of the present disclosure.

FIG. 14 is a diagram illustrating an example of a screen displayed on the controller 2 according to the third embodiment of the present disclosure. The second communication unit 205 of the controller 2 receives the notification information transmitted from the drone 1. The display unit 204 displays the notification information received by the second communication unit 205.

As illustrated in FIG. 14, the display unit 204 displays notification information, "Insufficient illuminance: Turning to bright direction".

As described above, in the third embodiment, if a detected illuminance in the flight direction of the drone 1 does not satisfy the required illuminance, the drone 1 flies in a direction different from the flight direction. As a result, it becomes possible to prevent the drone 1 from flying into a place where it is difficult for the operator 3 to visually observe the drone 1.

Although the turnaround control section 15 automatically turns the drone 1 around in the third embodiment, the present disclosure is not particularly limited. The turnaround control section 15 may retreat the drone 1 in an opposite direction to the flight direction of the drone 1 without turning the drone 1 around, instead. Alternatively, the turnaround control section 15 may turn the drone 1 by 90 degrees to the left or right from the flight direction. Alternatively, the turnaround control section 15 may increase or decrease the altitude of the drone 1.

In addition, in the third embodiment, the drone 1 may include a storage unit such as a semiconductor memory. The storage unit may include a flight impossible direction storage section. The turnaround control section 15 stores, as a flight impossible direction, a flight direction in which the drone 1 is inhibited from flying in the flight impossible direction storage section while associating the flight direction with a position at which the drone 1 is inhibited from flying in the flight direction. If control information for flying the drone 1 in the flight impossible direction is received after the turnaround control section 15 turns the drone 1 around, the flight control section 11 may invalidate the control information.

In the third embodiment, the control unit 105 need not include the notification control section 14, and the drone 1 need not notify the controller 2 that the drone 1 is to turn around.

Fourth Embodiment

Figure 15:
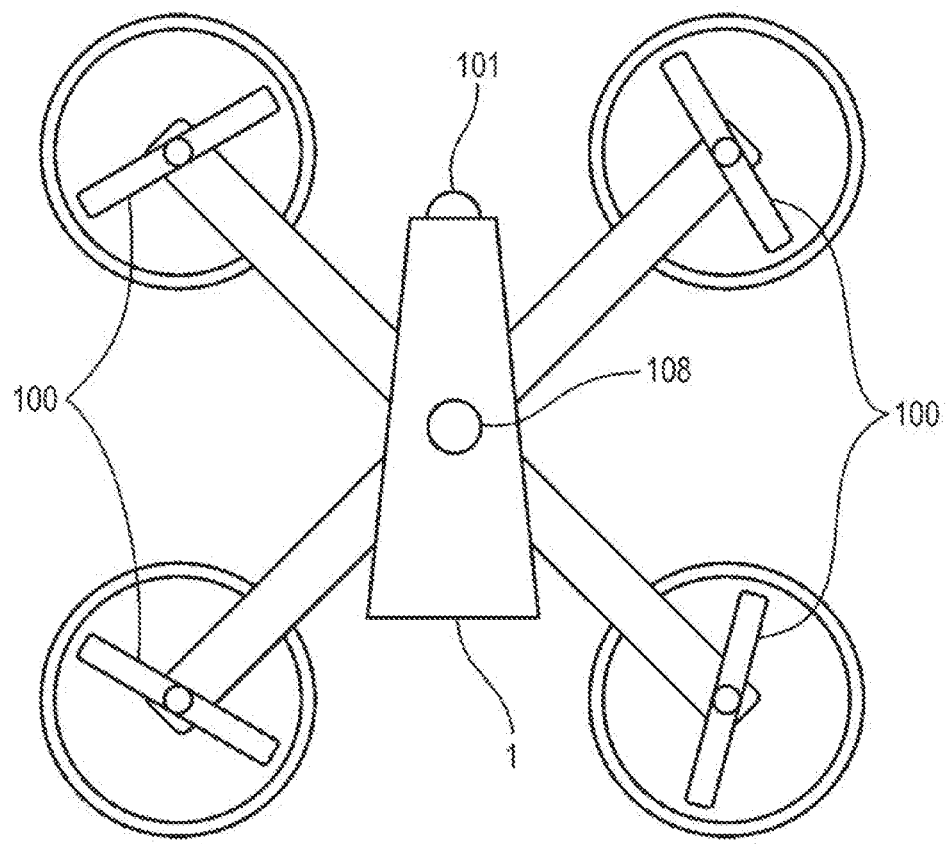
FIG. 15 is a plan view of a drone according to a fourth embodiment of the present disclosure.

FIG. 15 is a plan view of a drone 1 according to a fourth embodiment of the present disclosure. The same components of the drone 1 according to the fourth embodiment illustrated in FIG. 15 as those of the drone 1 illustrated in FIG. 1 are given the same reference numerals, and description thereof is omitted.

A position sensor 108 is provided on an upper surface of the drone 1. The position sensor 108 is a global positioning system (GPS) sensor, for example, and obtains the current position of the drone 1. The current position of the drone 1 is represented by latitude, longitude, and altitude. The position at which the position sensor 108 is provided is not limited to the upper surface of the drone 1. The position sensor 108 may be provided anywhere on the drone 1 insofar as the position sensor 108 can obtain the current position of the drone 1.

Figure 16:
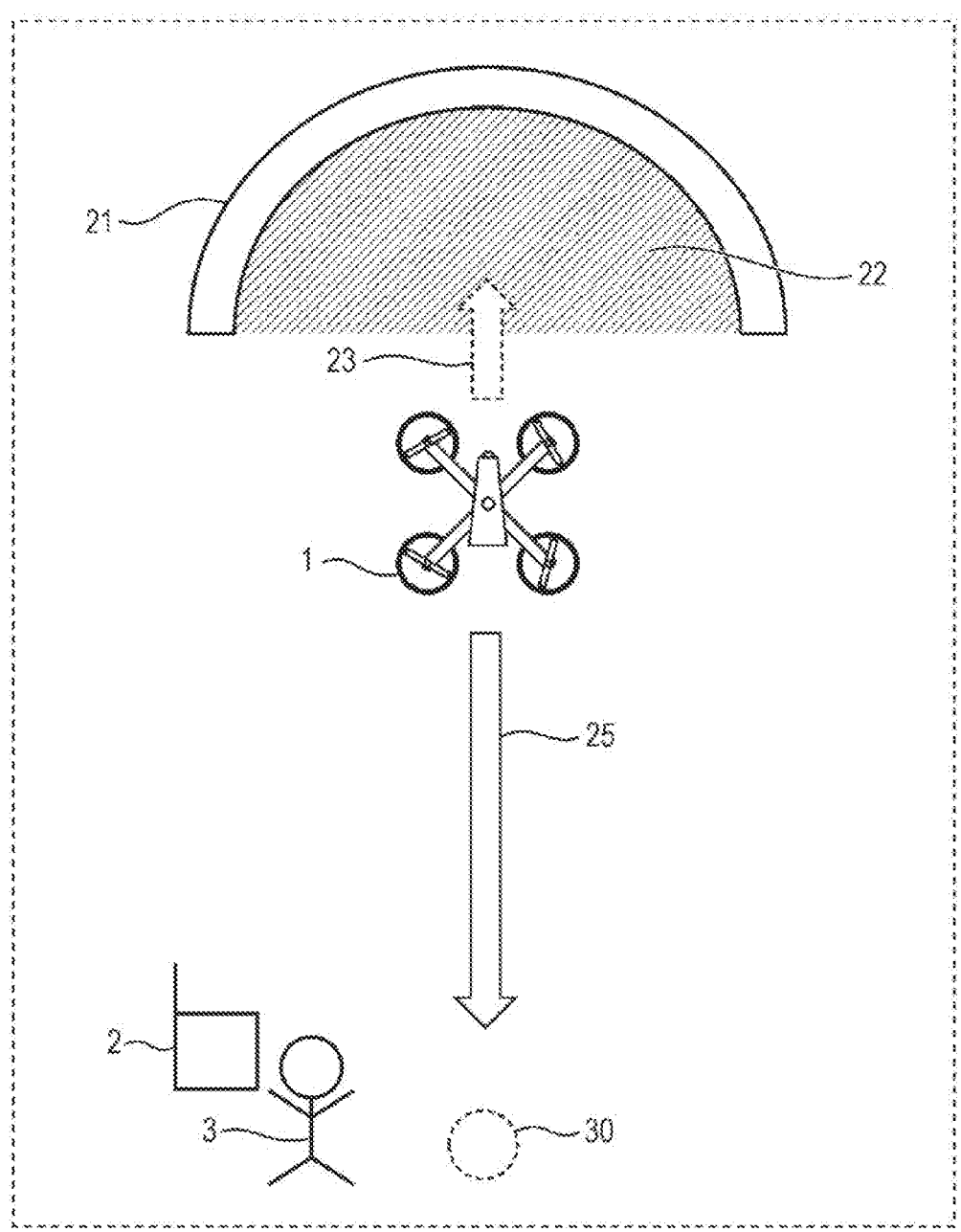
FIG. 16 is a schematic diagram illustrating the operation of the drone according to the fourth embodiment.

FIG. 16 is a schematic diagram illustrating the operation of the drone 1 according to the fourth embodiment.

In the fourth embodiment, if an illuminance in the flight direction of the drone 1 detected by the illuminance sensor 101 on the drone 1 does not satisfy the required illuminance for the drone 1 to fly, the drone 1 is inhibited from flying in the flight direction. In addition, as illustrated in FIG. 16, the drone 1 stores a flight start position 30, which indicates a position at which the drone 1 started to fly, in the fourth embodiment of the present disclosure. If the detected illuminance does not satisfy the required illuminance, the drone 1 flies in a direction 25 of the stored flight start position 30 to return to the flight start position 30.

Figure 17:
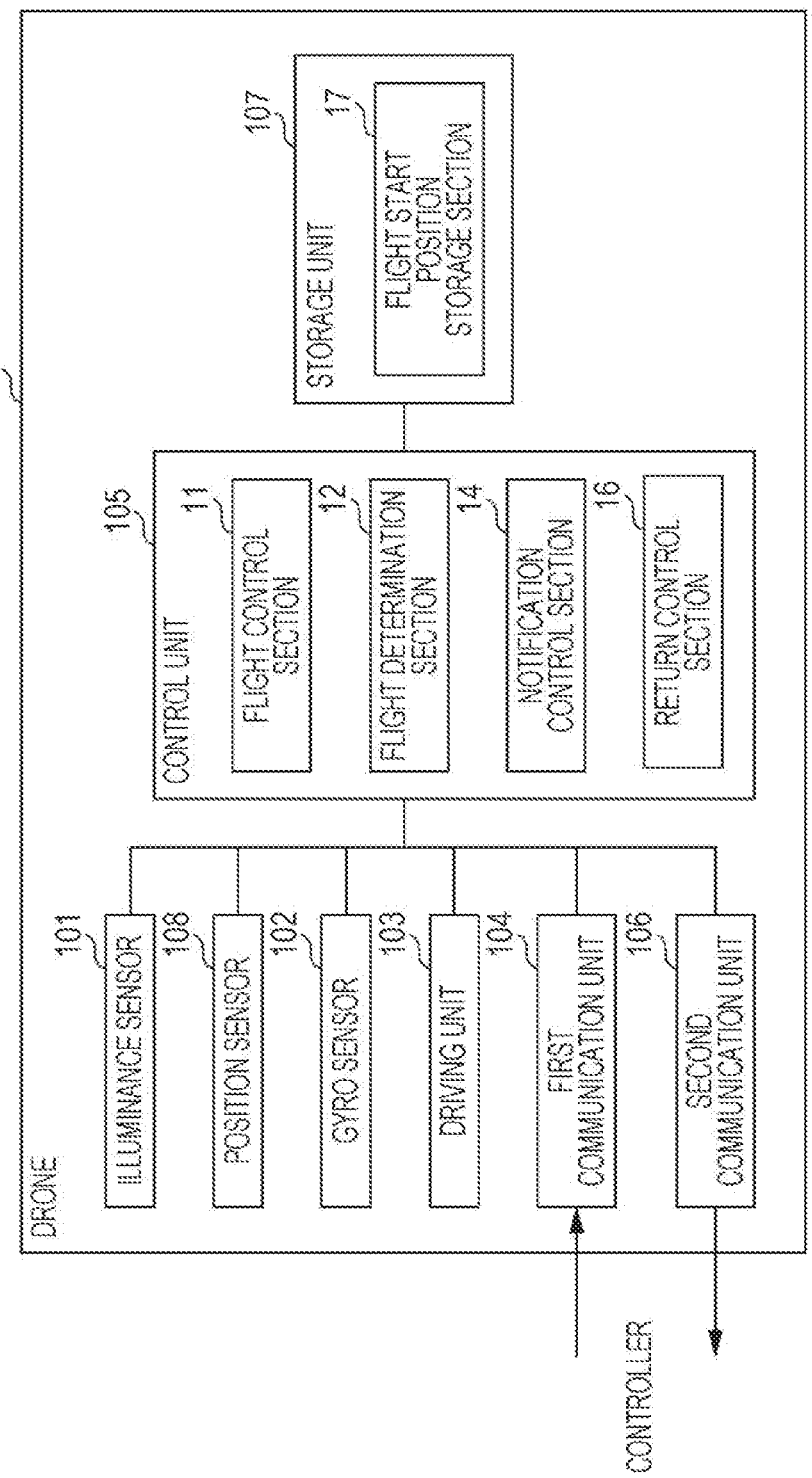
FIG. 17 is a block diagram illustrating the configuration of the drone according to the fourth embodiment of the present disclosure.

FIG. 17 is a block diagram illustrating the configuration of the drone 1 according to the fourth embodiment of the present disclosure. The drone 1 illustrated in FIG. 17 includes the illuminance sensor 101, the gyro sensor 102, the driving unit 103, the first communication unit 104, the control unit 105, the second communication unit 106, a storage unit 107, and the position sensor 108. The same components of the drone 1 according to the fourth embodiment illustrated in FIG. 17 as those of the drone 1 illustrated in FIG. 3, 7, or 12 are given the same reference numerals, and description thereof is omitted.

The position sensor 108 obtains the current position of the drone 1.

The control unit 105 includes the flight control section 11, the flight determination section 12, the notification control section 14, and a return control section 16. The storage unit 107 is a semiconductor memory, for example, and stores various pieces of information, The storage unit 107 includes a flight start position storage section 17.

The flight start position storage section 17 stores a flight start position, which indicates a position at which the drone 1 started to fly.

When the drone 1 starts to fly, the flight control section 11 obtains the current position from the position sensor 108 and stores the obtained current position in the flight start position storage section 17 as a flight start position.

Figure 18:
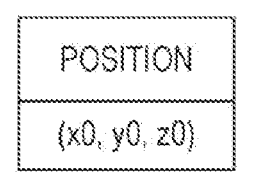

FIG. 18 is a diagram illustrating an example of flight start position information stored in the flight start position storage section 17. As illustrated in FIG. 18, the flight start position information is represented by a latitude x0, a longitude y0, and an altitude z0.

If the flight determination section 12 determines that a detected illuminance does not satisfy the required illuminance, the return control section 16 causes the drone 1 to autonomously fly to the flight start position stored in the flight start position storage section 17 to return the drone 1 to the flight start position.

If the flight determination section 12 determines that a detected illuminance does not satisfy the required illuminance, the notification control section 14 generates notification information indicating that the drone 1 is to return to the flight start position. The notification control section 14 outputs the generated notification information to the second communication unit 106.

The second communication unit 106 wirelessly transmits the notification information generated by the notification control section 14 to the controller 2.

The configuration of the controller 2 according to the fourth embodiment is the same as that of the controller 2 according to the second embodiment illustrated in FIG. 8, and description thereof is omitted.

Next, a process for controlling the flight of the drone 1 according to the fourth embodiment will be described.

Figure 19:
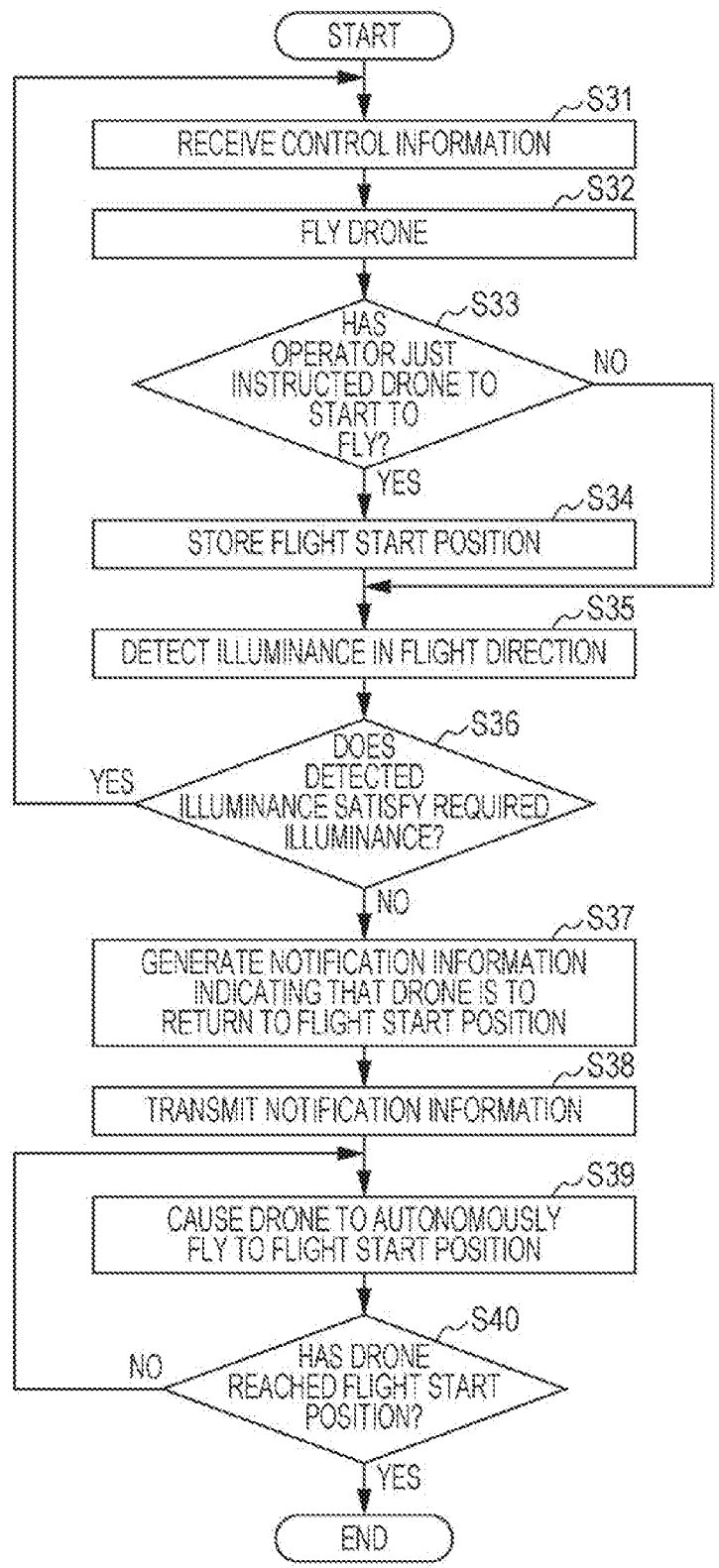
FIG. 19 is a flowchart illustrating a process for controlling the flight of a drone according to the fourth embodiment.

FIG. 19 is a flowchart illustrating the process for controlling the flight of the drone 1 according to the fourth embodiment.

First, in step S31, the first communication unit 104 receives control information transmitted from the first communication unit 104.

Next, in step S32, the flight control section 11 flies the drone 1 in accordance with the control information received by the first communication unit 104.

Next, in step S33, the flight control section 11 determines whether the operator 3 has just instructed the drone 1 to start to fly. If the operator 3 has not just instructed the drone 1 to start to fly, that is, if the drone 1 has already been flying (NO in step S33), the process proceeds to step 55.

If the operator 3 has just instructed the drone 1 to start to fly (YES in step S33), on the other hand, the flight control section 11, in step S34, obtains the current position from the position sensor 108 and stores the obtained current position in the flight start position storage section 17 as a flight start position.

Steps S35 and S36 are the same as steps S3 and S4, respectively, illustrated in FIG. 5, and description thereof is omitted.

If a detected illuminance does not satisfy the required illuminance (NO in step S36), the notification control section 14, in step S37, generates notification information indicating that the drone 1 is to return to the flight start position.

Next, in step S38, the second communication unit 106 transmits the notification information generated by the notification control section 14 to the controller 2.

Next, in step S39, the return control section 16 causes the drone 1 to autonomously fly to the flight start position stored in the flight start position storage section 17. At this time, the return control section 16 may cause the drone 1 to fly straight to the flight start position from the current position. Alternatively, the return control section 16 may fly the drone 1 from the current position represented in two-dimensional coordinates (latitude and longitude) to the flight start position represented by two-dimensional coordinates (latitude and longitude) while maintaining a certain altitude, and land the drone 1 at the flight start position.

Next, in step S40, the return control section 16 determines whether the drone 1 has reached the flight start position. The return control section 16 may determine whether the drone 1 has reached the flight start position by obtaining the current position from the position sensor 108 and comparing the obtained current position with the flight start position stored in the flight start position storage section 17. If the drone 1 has not reached the flight start position (NO in step S40), the process returns to step S39.

If the drone 1 has reached the flight start position (YES in step S40), on the other hand, the process for controlling the flight of the drone 1 ends.

Figure 20:
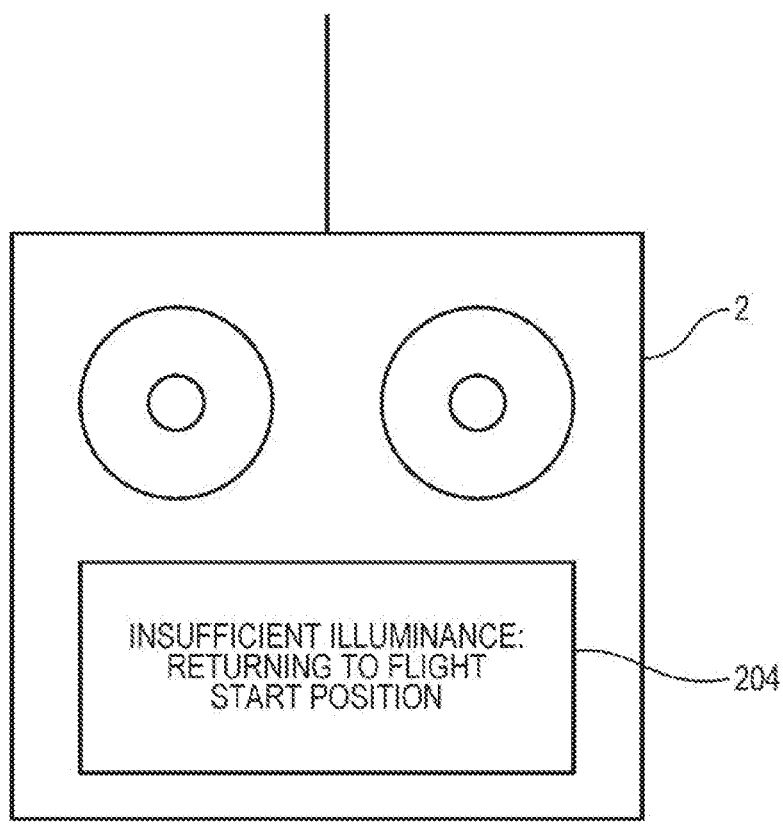
FIG. 20 is a diagram illustrating an example of a screen displayed on a controller according to the fourth embodiment of the present disclosure.

FIG. 20 is a diagram illustrating an example of a screen displayed on the controller 2 according to the fourth embodiment of the present disclosure. The second communication unit 205 of the controller 2 receives notification information transmitted from the drone 1. The display unit 204 displays the notification information received by the second communication unit 205.

As illustrated in FIG. 20, the display unit 204 displays notification information, "Insufficient illuminance: Returning to flight start position".

As described above, in the fourth embodiment, if a detected illuminance in the flight direction of the drone 1 does not satisfy the required illuminance, the drone 1 autonomously flies to the flight start position. As a result, it becomes possible to prevent the drone 1 from flying into a place where it is difficult for the operator 3 to visually observe the drone 1.

Although the return control section 16 returns the drone 1 to the flight start position in the fourth embodiment, the present disclosure is not particularly limited to this. The return control section 16 may fly the drone 1 to a current position of the controller 2, instead. Alternatively, the return control section 16 may fly the drone 1 to a position preset by the operator 3.

In addition, although the position sensor 108 is a GPS sensor, the return control section 16 may return the drone 1 to the flight start position using the gyro sensor 102 or an infrared sensor if it is difficult to receive GPS signals because, for example, the drone 1 is flying inside a building.

In addition, in the fourth embodiment, the control unit 105 need not include the notification control section 14, and the drone 1 need not notify the controller 2 that the drone 1 is to return to the flight start position.

Fifth Embodiment

Figure 21:
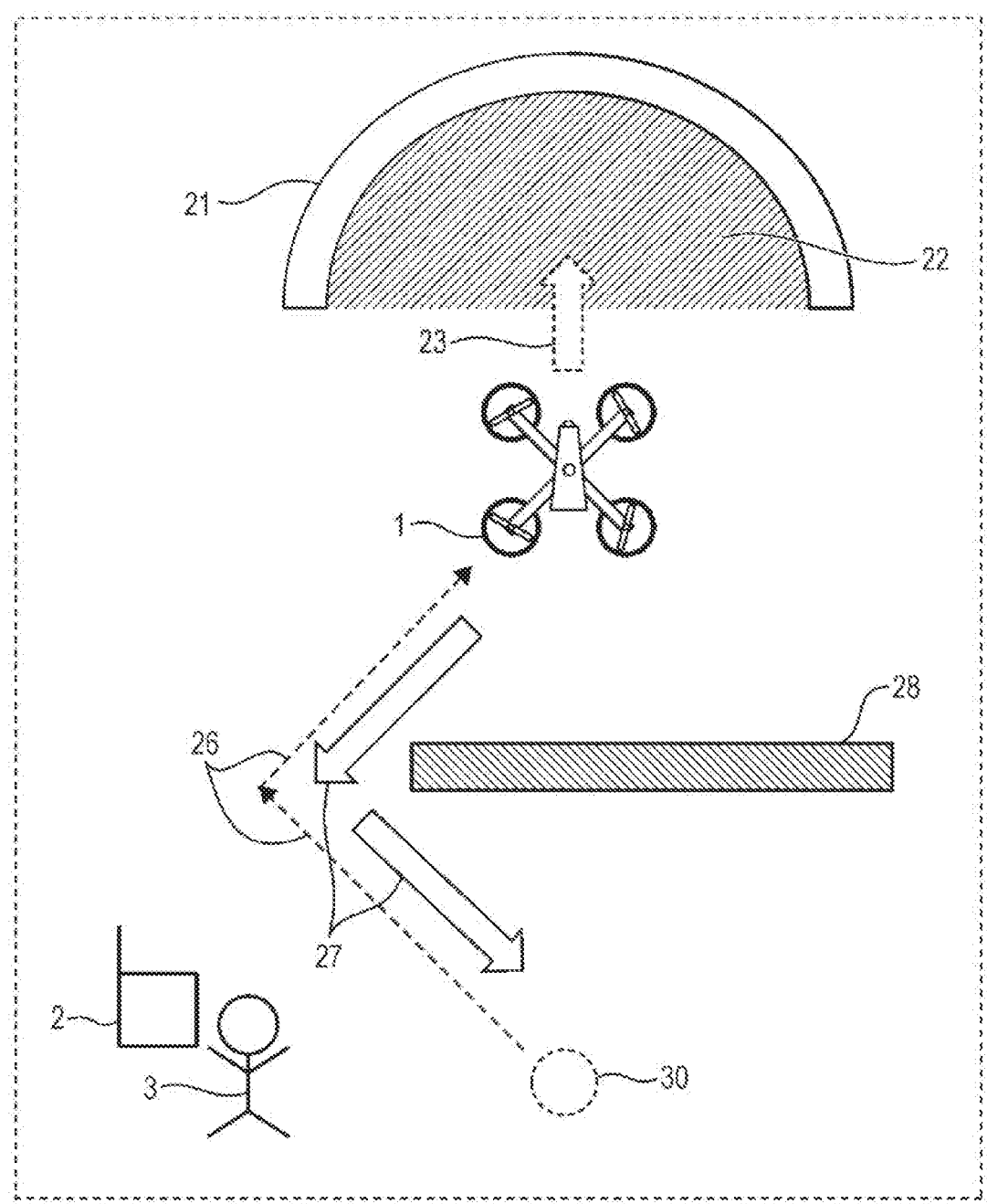
FIG. 21 is a schematic diagram illustrating the operation of a drone according to a fifth embodiment.

FIG. 21 is a schematic diagram illustrating the operation of a drone 1 according to a fifth embodiment.

In the fifth embodiment, if an illuminance in the flight direction of the drone 1 detected by the illuminance sensor 101 on the drone 1 does not satisfy the required illuminance for the drone 1 to fly, the drone 1 is inhibited from flying in the flight direction. In addition, as illustrated in FIG. 21, the drone 1 stores a flight route 26 from the flight start position 30, which is the position at which the drone 1 started to fly, to the current position in the fifth embodiment of the present disclosure. If the detected illuminance does not satisfy the required illuminance, the drone 1 flies in a direction 27 of the flight start position 30 along the stored flight route 26 to return to the flight start position 30.

If the drone 1 has avoided an obstacle 28 while flying from the flight start position 30 to the current position, and if the drone 1 flies straight to the flight start position 30 from the current position, the drone 1 might collide with the obstacle 28. In the fifth embodiment, therefore, if a detected illuminance does not satisfy the required illuminance, the drone 1 returns to the flight start position 30 along with a flight route. As a result, the drone 1 does not collide with an obstacle while returning to the flight start position 30.

Figure 22:
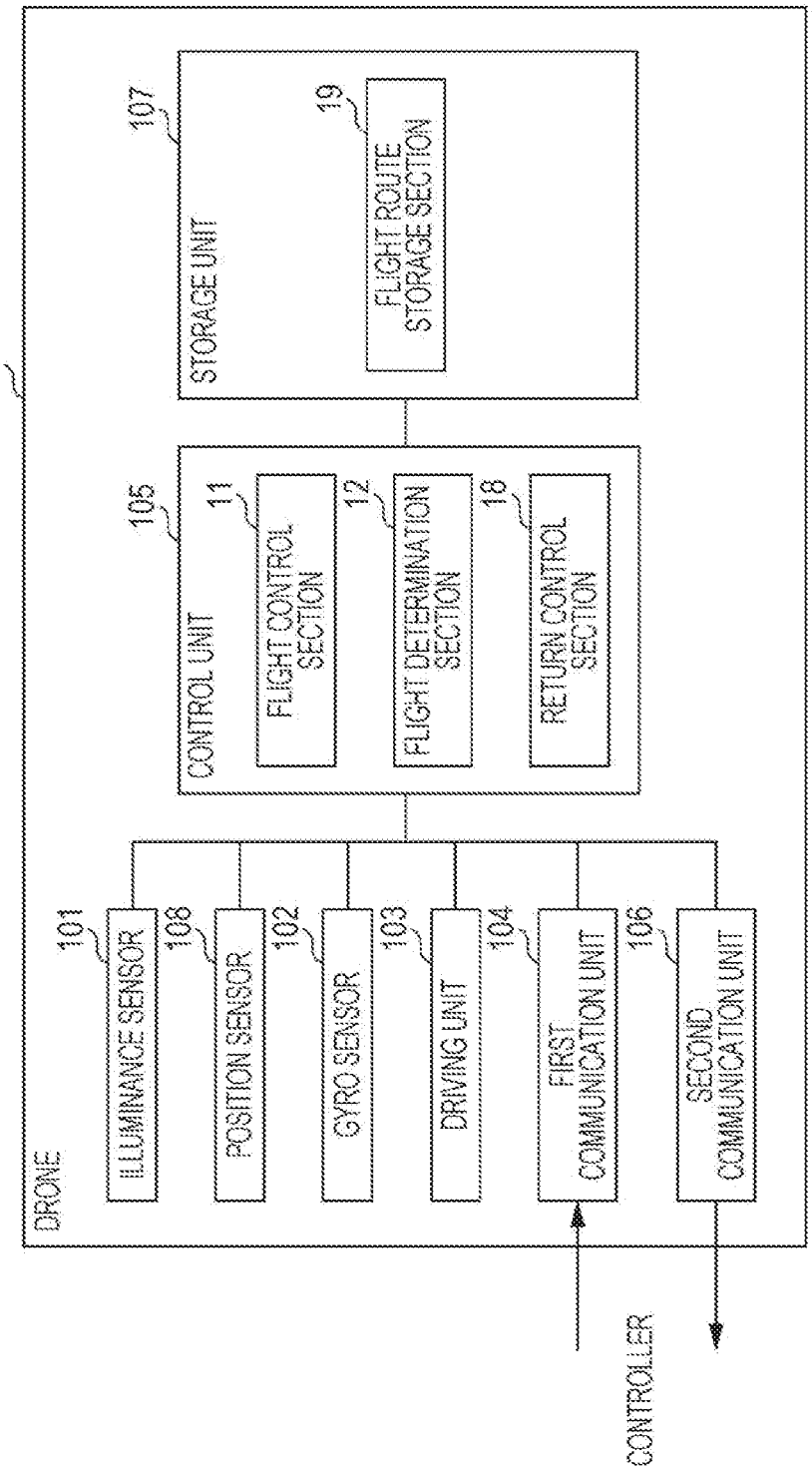
FIG. 22 is a block diagram illustrating the configuration of the drone according to the fifth embodiment of the present disclosure.

FIG. 22 is a block diagram illustrating the configuration of the drone 1 according to the fifth embodiment of the present disclosure. The drone 1 illustrated in FIG. 22 includes the illuminance sensor 101, the gyro sensor 102, the driving unit 103, the first communication unit 104, the control unit 105, the second communication unit 106, the storage unit 107, and the position sensor 108. The same components of the drone 1 according to the fifth embodiment illustrated in FIG. 22 as those of the drone 1 illustrated in FIG. 3, 7, 12, or 17 are given the same reference numerals, and description thereof is omitted.

The control unit 105 includes the flight control section 11 the flight determination section 12, and a return control section 18. The storage unit 107 includes a flight route storage section 19.

The flight route storage section 19 stores a flight route from a flight start position 30, which indicates a position at which the drone 1 started to fly, to the current position.

While the drone 1 is flying, the flight control section 11 regularly obtains the current position from the position sensor 108 and stores the obtained current positions in the flight route storage section 19 in chronological order.

Figure 23:
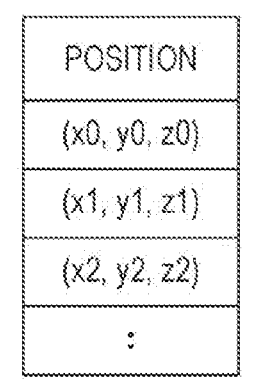

FIG. 23 is a diagram illustrating an example of flight route information stored in the flight route storage section 19. As illustrated in FIG. 23, the flight route information includes obtained current positions (latitude, longitude, and altitude) in chronological order. Timings at which the current position is obtained are not particularly limited. If the current position is obtained frequently, an accurate flight route can be created, and if the current position is obtained infrequently, the storage unit 107 can save memory space.

If a detected illuminance does not satisfy the required illuminance, the return control section 18 reversely flies the drone 1 along a flight route stored in the flight route storage section 19 to return the drone 1 to the flight start position.

The configuration of the controller 2 according to the fifth embodiment is the same as that of the controller 2 according to the second embodiment illustrated in FIG. 8, and description thereof is omitted.

Next, a process for controlling the flight of the drone 1 according to the fifth embodiment will be described.

Figure 24:
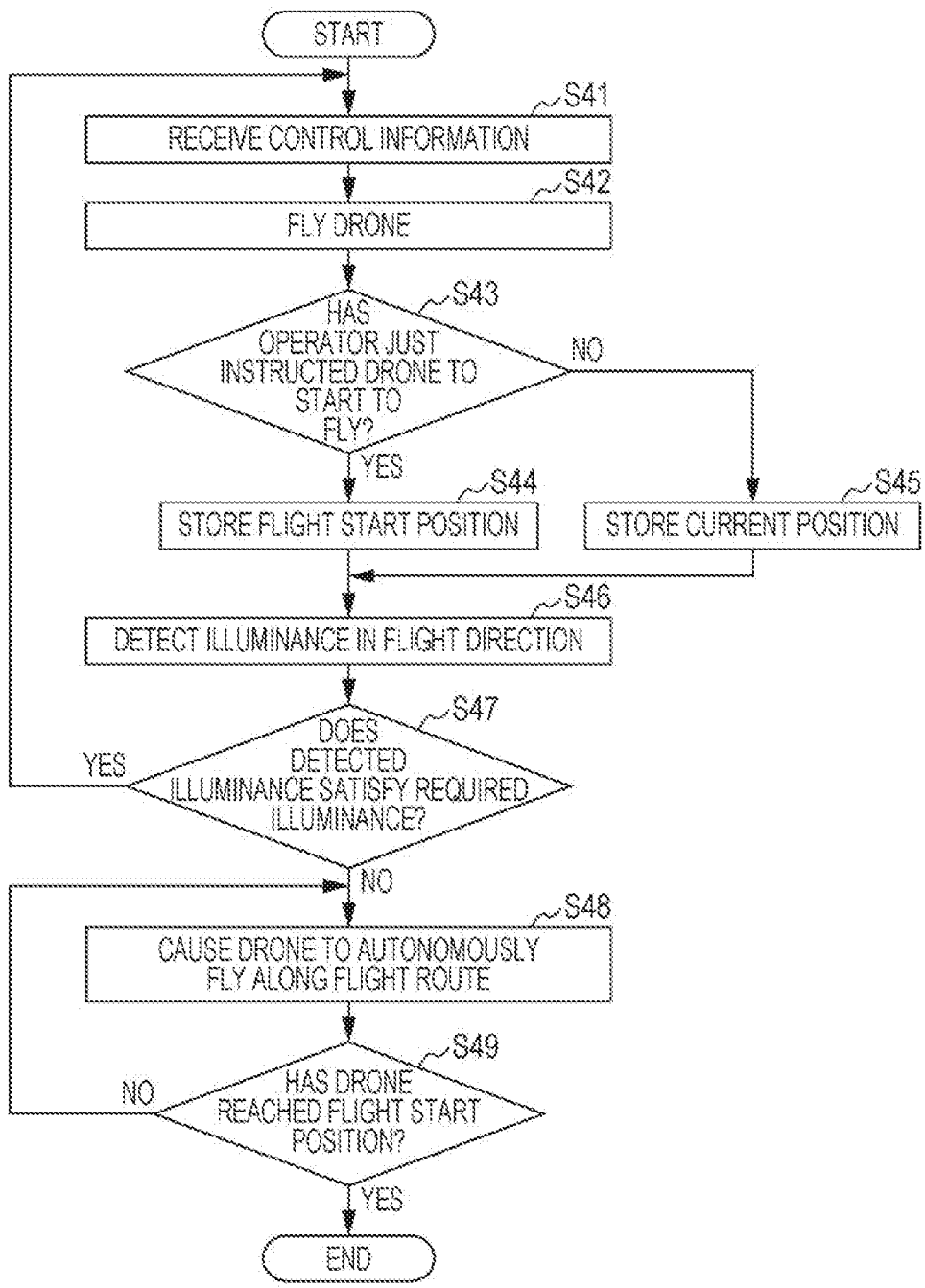
FIG. 24 is a flowchart illustrating a process for controlling the flight of a drone according to the fifth embodiment.

FIG. 24 is a flowchart illustrating the process for controlling the flight of the drone 1 according to the fifth embodiment.

Steps S41 to S43 are the same as steps S31 to S33, respectively, illustrated in FIG. 19, and description thereof is omitted.

If the operator 3 has just instructed the drone 1 to start to fly (YES in step S43), the flight control section 11, in step S44, obtains the current position from the position sensor 108 and stores the obtained current position in the flight route storage section 19 as a flight start position.

If the operator 3 has not just instructed the drone 1 to start to fly, that is, if the drone 1 has already been flying (NO in step S43), the flight control section 11, in step S45, obtains the current position from the position sensor 108 and stores the obtained current position in the flight route storage section 19.

Steps S46 and S47 are the same as steps S3 and S4, respectively, illustrated in FIG. 5, and description thereof is omitted.

If the detected illuminance does not satisfy the required illuminance (NO in step S47), the return control section 18, in step S48, causes the drone 1 to autonomously reversely fly along a flight route stored in the flight route storage section 19.

Next, in step S49, the return control section 18 determines whether the drone 1 has reached the flight start position. If the drone 1 has not reached the flight start position (NO in step S49), the process returns to step S48.

If the drone 1 has reached the flight start position (YES in step S49), on the other hand, the process for controlling the flight of the drone 1 ends.

As described above, in the fifth embodiment, if a detected illuminance in the flight direction of the drone 1 does not satisfy the required illuminance, the drone 1 autonomously flies along a flight route from the current position to the flight start position. As a result, it becomes possible to prevent the drone 1 from flying into a place where it is difficult for the operator 3 to visually observe the drone 1.

In the fifth embodiment, the control unit 105 may include the notification control section 14, and the drone 1 may notify the controller 2 that the drone 1 is to return to the flight start position.

Sixth Embodiment

Figure 25:
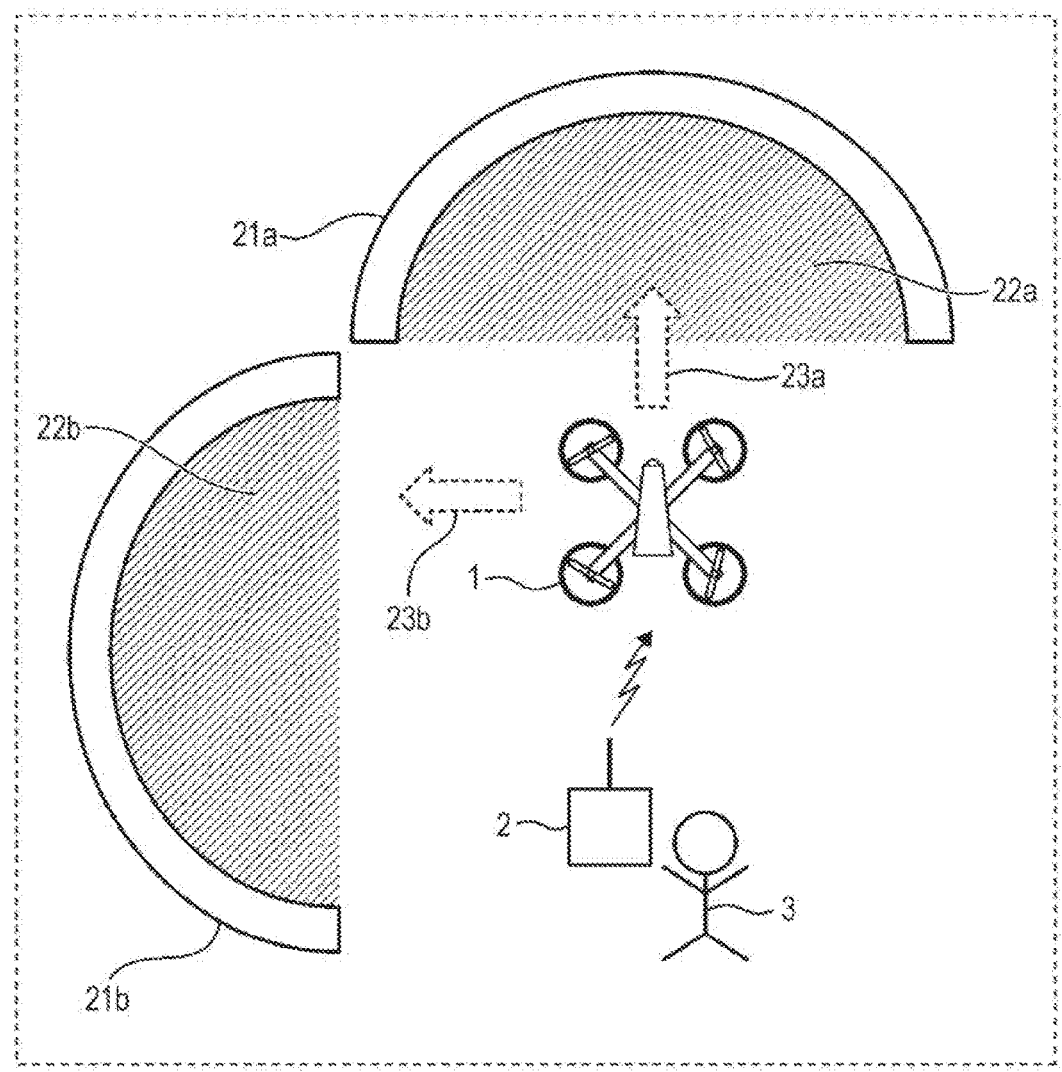
FIG. 25 is a schematic diagram illustrating the operation of a drone according to a sixth embodiment.

FIG. 25 is a schematic diagram illustrating the operation of a drone 1 according to a sixth embodiment.

In the sixth embodiment, if an illuminance in a flight direction 23a of the drone 1 detected by the illuminance sensor 101 on the drone 1 does not satisfy the required illuminance for the drone 1 to fly when the drone 1 is flying to an inside 22a of a structure 21a, the drone 1 is inhibited from flying in the flight direction 23a. In addition, if the detected illuminance does not satisfy the required illuminance, the drone 1 detects the current position thereof and stores, as a flight impossible direction, the flight direction 23a at the detected current position in the storage unit 107 while associating the flight direction 23a with positional information indicating the detected current position.

If an illuminance in a flight direction 23b of the drone 1 detected by the illuminance sensor 101 on the drone 1 does not satisfy the required illuminance for the drone 1 to fly when the flight direction 23a of the drone 1 has been changed to the flight direction 23b and the drone 1 is flying to an inside 22b of a structure 21b adjacent to the structure 21a, the drone 1 is inhibited from flying in the flight direction 23b.

The flight direction 23b of the drone 1 is then reset to the flight direction 23a. When the drone 1 is flying to the inside 22a of the structure 21a, the drone 1 determines whether the flight direction 23a is included in one of certain flight prohibition areas including flight impossible directions stored in the storage unit 107. Since the flight direction 23a is associated with the current position as the flight impossible direction in the storage unit 107, the drone 1 determines that the flight direction 23a is included in one of the certain flight prohibition areas including the flight impossible directions stored in the storage unit 107 and does not fly in the flight direction 23a.

Figure 26:
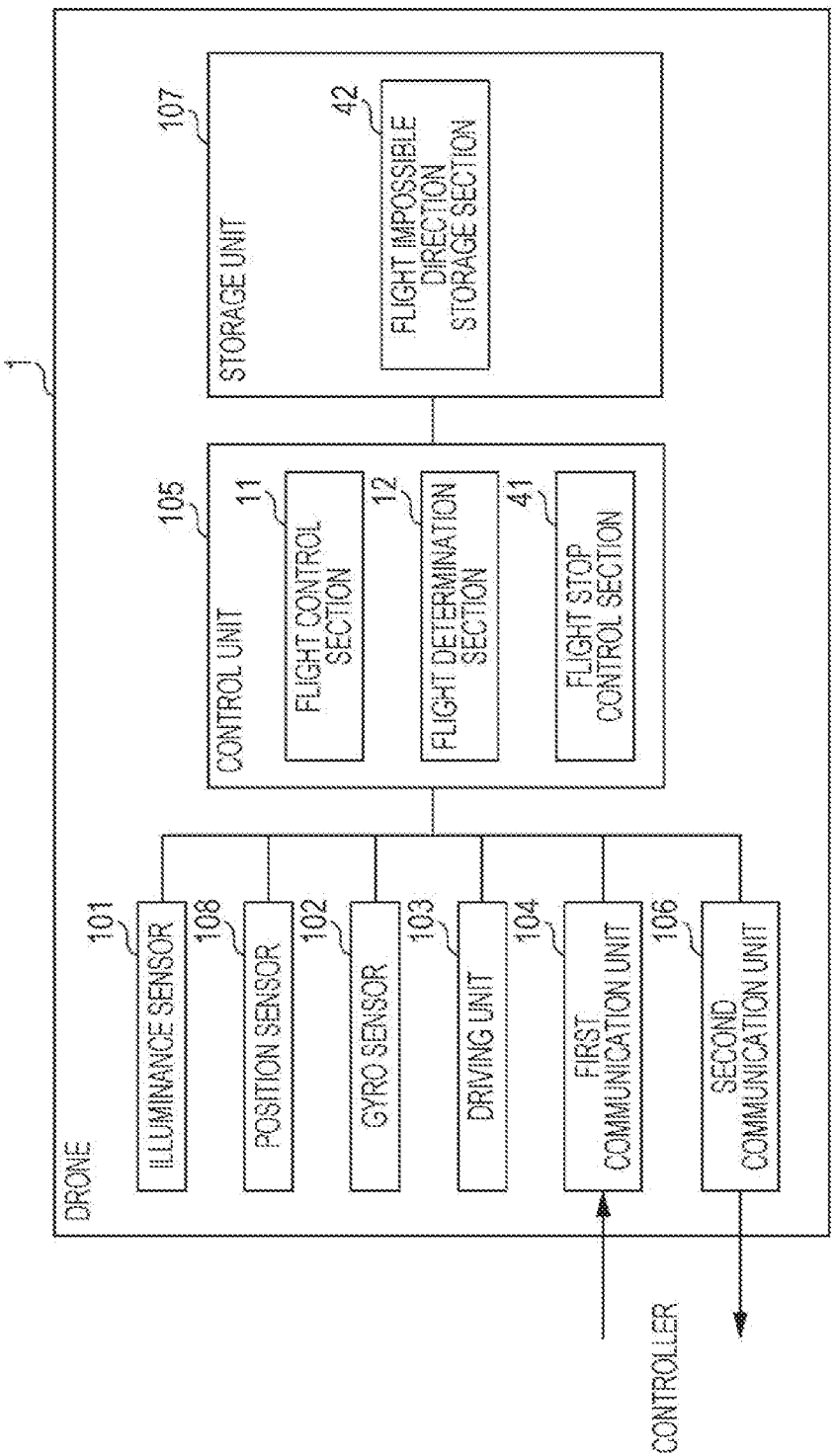
FIG. 26 is a block diagram illustrating the configuration of the drone according to the sixth embodiment of the present disclosure.

FIG. 26 is a block diagram illustrating the configuration of the drone 1 according to the sixth embodiment of the present disclosure. The drone 1 illustrated in FIG. 26 includes the illuminance sensor 101, the gyro sensor 102, the driving unit 103, the first communication unit 104, the control unit 105, the second communication unit 106, the storage unit 107, and the position sensor 108. The same components of the drone 1 according to the sixth embodiment illustrated in FIG. 26 as those of the drone 1 illustrated in FIG. 3, 7, 12, 17, or 22 are given the same reference numerals, and description thereof is omitted.

The control unit 105 includes the flight control section 11, the flight determination section 12, and a flight stop control section 41. The storage unit 107 includes a flight impossible direction storage section 42.

If a detected illuminance does not satisfy the required illuminance, the flight stop control section 41 obtains and stores the current position of the drone 1. The flight stop control section 41 stores, as a flight impossible direction, a flight direction at the obtained current position in the flight impossible direction storage section 42 while associating the flight direction with positional information indicating the obtained current position.

In the flight impossible direction storage section 42, positional information indicating the current position of the drone 1 and a flight impossible direction, in which the drone 1 is inhibited from flying, are associated with each other.

FIG. 27 is a diagram illustrating an example of flight impossible directions stored in the flight impossible direction storage section 42. As illustrated in FIG. 27, the flight impossible directions are associated with positional information (latitude, longitude, and altitude) and stored. The flight impossible directions are represented by angles on a horizontal plane. An angle of a flight direction when the drone 1 starts to fly is set as 0 degree, which is a reference angle. If the angle of the flight direction changes, the gyro sensor 102 detects the change from a previous flight direction. If a detected illuminance does not satisfy the required illuminance, the flight stop control section 41 stores, as a flight impossible direction, the angle of the current flight direction relative to the reference angle in the flight impossible direction storage section 42 while associating the angle with positional information. The drone 1 may include a geomagnetic sensor and set true north as 0 degree, which is the reference angle. The flight impossible directions may include not only horizontal angles but also vertical angles.

The flight stop control section 41 inhibits the drone 1 from flying into the certain flight prohibition areas including the flight impossible directions at the positions indicated by the positional information stored in the flight impossible direction storage section 42.

The configuration of the controller 2 according to the sixth embodiment is the same as that of the controller 2 according to the second embodiment illustrated in FIG. 8, and description thereof is omitted.

Next, a process for controlling the flight of the drone 1 according to the sixth embodiment will be described.

Figure 28:
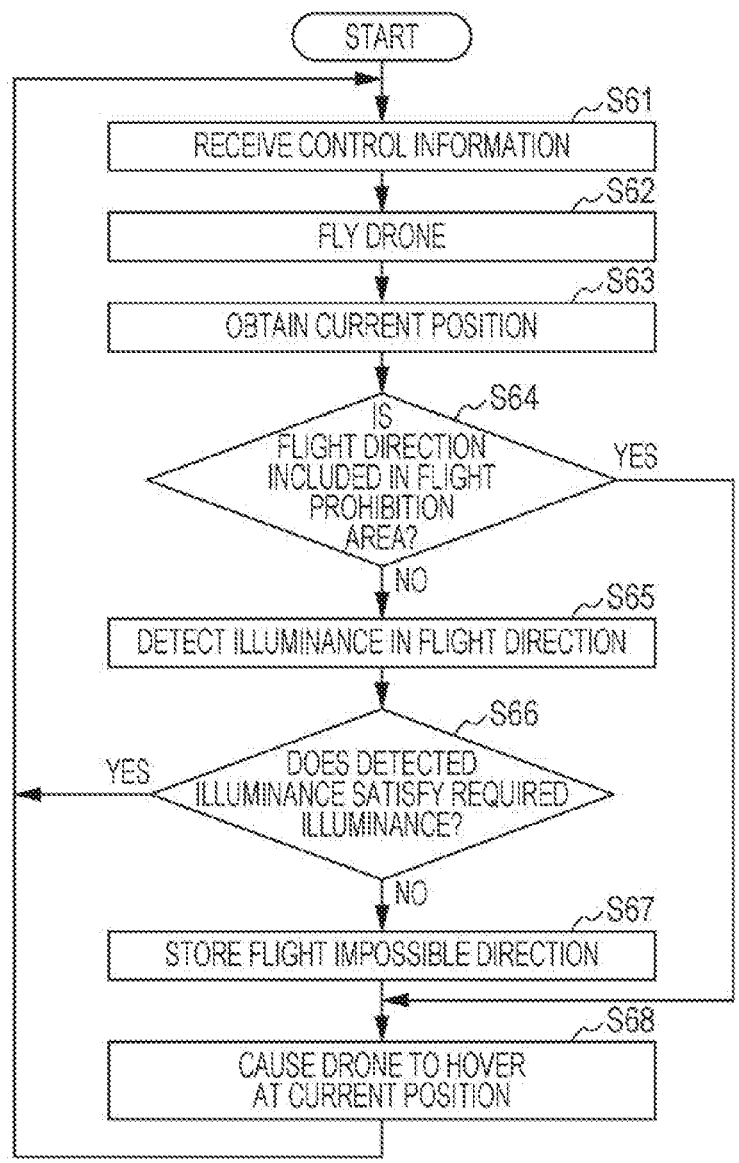
FIG. 28 is a flowchart illustrating a process for controlling the flight of a drone according to the sixth embodiment.

FIG. 28 is a flowchart illustrating the process for controlling the flight of the drone 1 according to the sixth embodiment.

First, in step S61, the first communication unit 104 receives control information transmitted from the controller 2.

Next, in step S62, the flight control section 11 flies the drone 1 in accordance with the control information received by the first communication unit 104.

Next, in step S63, the flight stop control section 41 obtains the current position measured by the position sensor 108.

Next, in step S64, the flight stop control section 41 determines whether the current flight direction of the drone 1 is included in one of the certain flight prohibition areas including the flight impossible directions stored in the flight impossible direction storage section 42.

Figure 29:
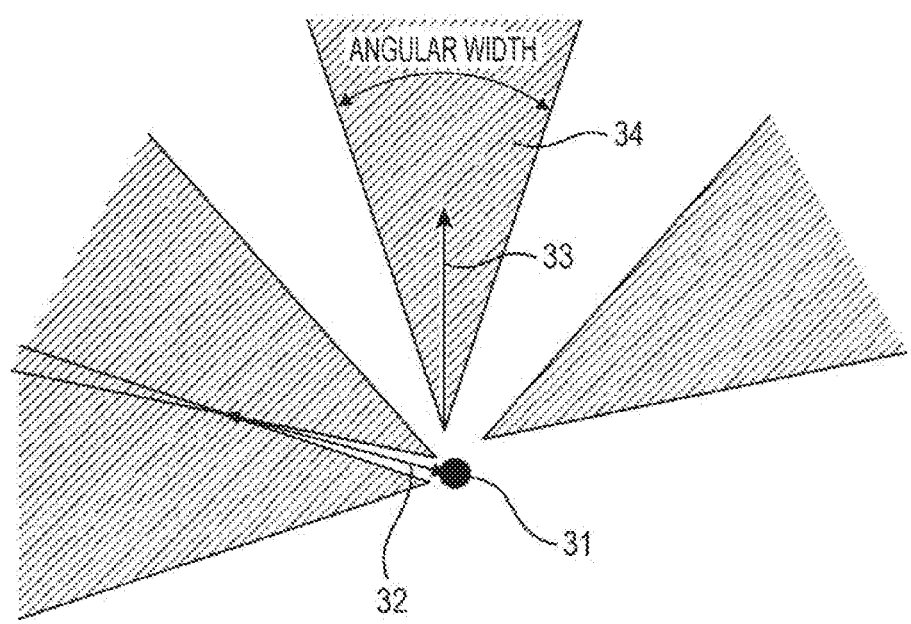
FIG. 29 is a schematic diagram illustrating flight prohibition areas according to the sixth embodiment.

FIG. 29 is a schematic diagram illustrating the flight prohibition areas according to the sixth embodiment. As illustrated in FIG. 29, each flight probation area 34 is a triangular area whose vertex is the position of the drone 1 at a time when it was determined that a detected illuminance did not satisfy the required illuminance and that includes, within a certain angular width, a flight impossible direction 33 at a time when it was determined that the detected illuminance did not satisfy the required illuminance.

If two flight prohibition areas overlap within a certain range 32 from a current position 31, the flight stop control section 41 inhibits the drone 1 from flying in that flight direction. Each flight prohibition area 34 need not be triangular but may have a fan shape.

In FIG. 28, if the current flight direction of the drone 1 is included in one of the flight prohibition areas (YES in step S64), the process proceeds to step S68.

If the current flight direction of the drone 1 is not included in any flight prohibition area (NO in step S64), the illuminance sensor 101, in step S65, detects the illuminance in the flight direction of the drone 1.

Steps S65 and S66 are the same as steps S3 and S4, respectively, illustrated in FIG. 5, and description thereof is omitted.

If the detected illuminance does not satisfy the required illuminance (NO in step S66), the flight stop control section 41, in step S67, stores, as a flight impossible direction, the flight direction at the obtained current position in the flight impossible direction storage section 42 while associating the flight direction with positional information indicating the obtained current position.

Next, in step 368, the flight stop control section 41 causes the drone 1 to hover at the current position.

As described above, if a detected illuminance does not satisfy the required illuminance, a flight impossible direction is associated with positional information and stored. As a result, a plurality of flight impossible directions in which the drone 1 does not fly can be accumulated. In addition, whether the drone 1 can fly in the flight direction can be determined, without detecting an illuminance in the flight direction, using the plurality of flight impossible directions accumulated.

When detecting an illuminance in the flight direction, the illuminance sensor 101 may detect illuminances in all directions of the drone 1, and the flight determination section 12 may determine whether each of the detected illuminances in all the directions satisfies the required illuminance. The flight stop control section 41 may then determine directions in which the illuminances do not satisfy the required illuminance as flight impossible directions.

Seventh Embodiment

In a seventh embodiment, as in the sixth embodiment, if a detected illuminance does not satisfy the required illuminance, the drone 1 detects the current position thereof and stores, as a flight impossible direction, the flight direction at the detected current position in the storage unit 107 while associating the flight direction with positional information indicating the detected current position. If there are flight prohibition areas in all directions of the drone 1 at the position indicated by the positional information stored in the storage unit 107, the flight of the drone 1 is temporarily allowed to fly in any direction.

Figure 30:
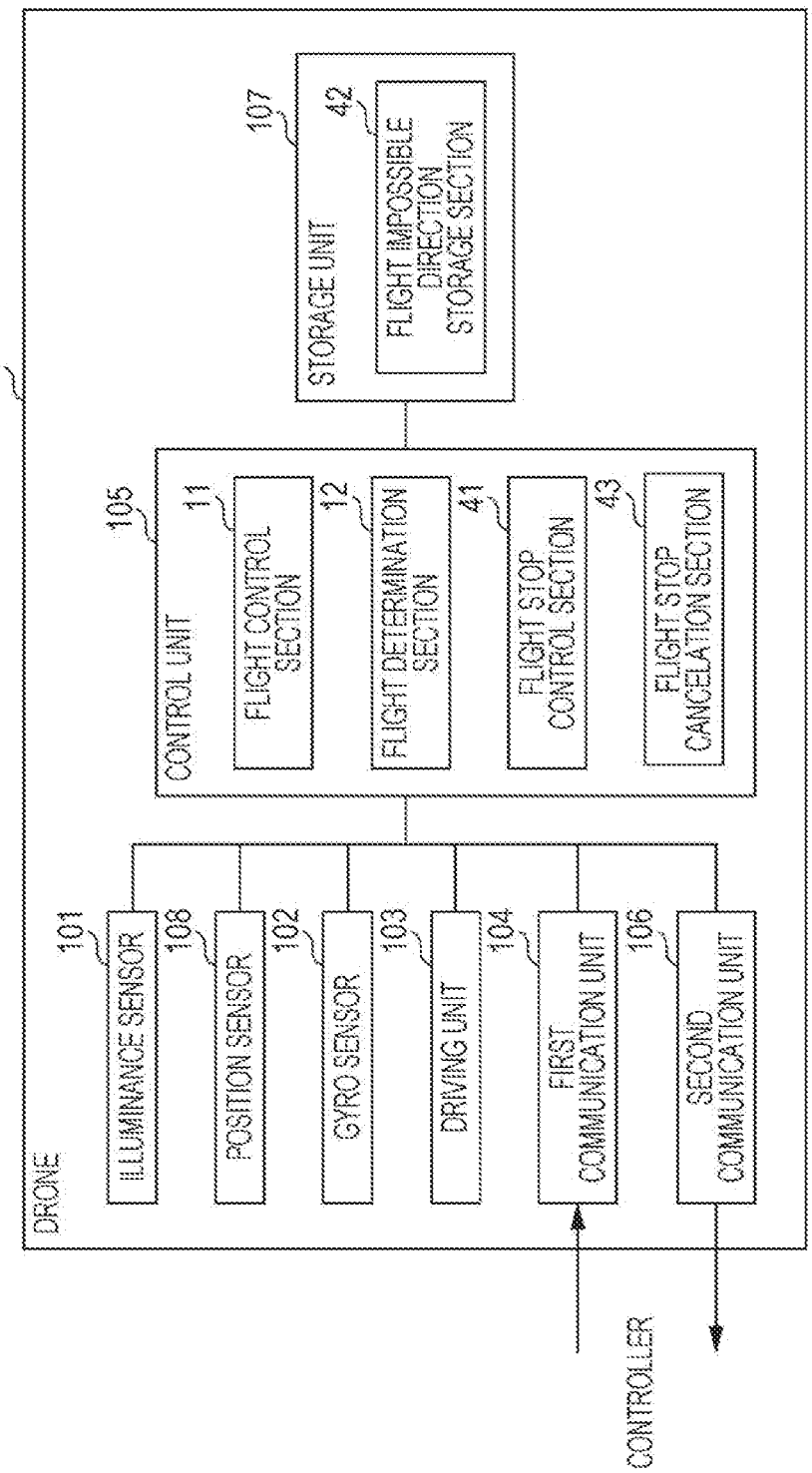
FIG. 30 is a block diagram illustrating the configuration of a drone according to a seventh embodiment of the present disclosure.

That is, if it becomes difficult to visually observe the drone 1 due to sunset or a sudden change in the weather during flight, the drone 1 is allowed to fly in any direction for a certain period of time in order to prevent the drone 1 from being stuck FIG. 30 is a block diagram illustrating the configuration of a drone 1 according to the seventh embodiment of the present disclosure. The drone 1 illustrated in FIG. 30 includes the illuminance sensor 101, the gyro sensor 102, the driving unit 103, the first communication unit 104, the control unit 105, the second communication unit 106, the storage unit 107, and the position sensor 108 The same components of the drone 1 according to the seventh embodiment illustrated in FIG. 30 as those of the drone 1 illustrated in FIG. 3, 7, 12, 17, 22, or 26 are given the same reference numerals, and description thereof is omitted.

The control unit 105 includes the flight control section 11, the flight determination section 12, the flight stop control section 41, and a flight stop cancelation section 43. The storage unit 107 includes the flight impossible direction storage section 42.

If there are flight prohibition areas in all directions of the drone 1 at a position indicated by positional information stored in the flight impossible direction storage section 42, the flight stop cancelation section 43 allows the drone 1 to fly in accordance with the remote control performed by the operator 3.

The configuration of the controller 2 according to the seventh embodiment is the same as that of the controller 2 according to the second embodiment illustrated in FIG. 8, and description thereof is omitted.

Next, a process for controlling the flight of the drone 1 according to the seventh embodiment will be described.

Figure 31:
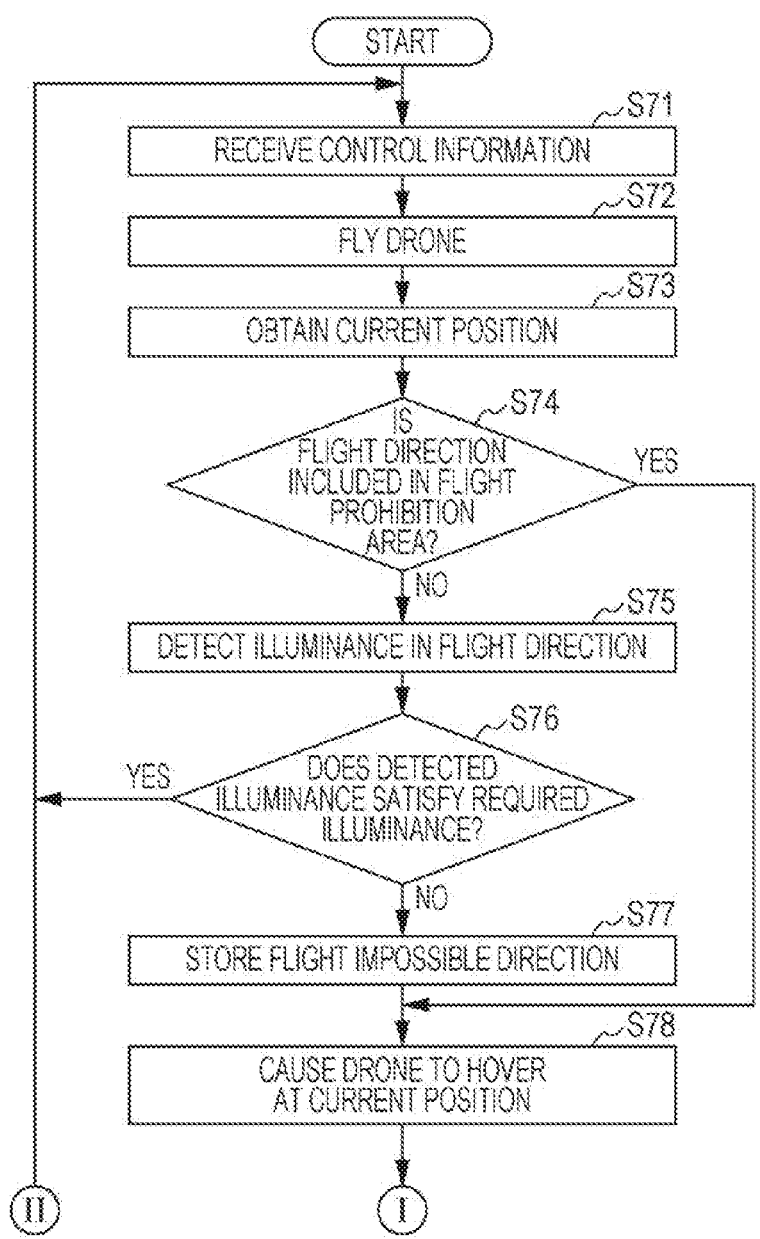
FIG. 31 is a first flowchart illustrating a process for controlling the flight of a drone according to the seventh embodiment.
Figure 32:
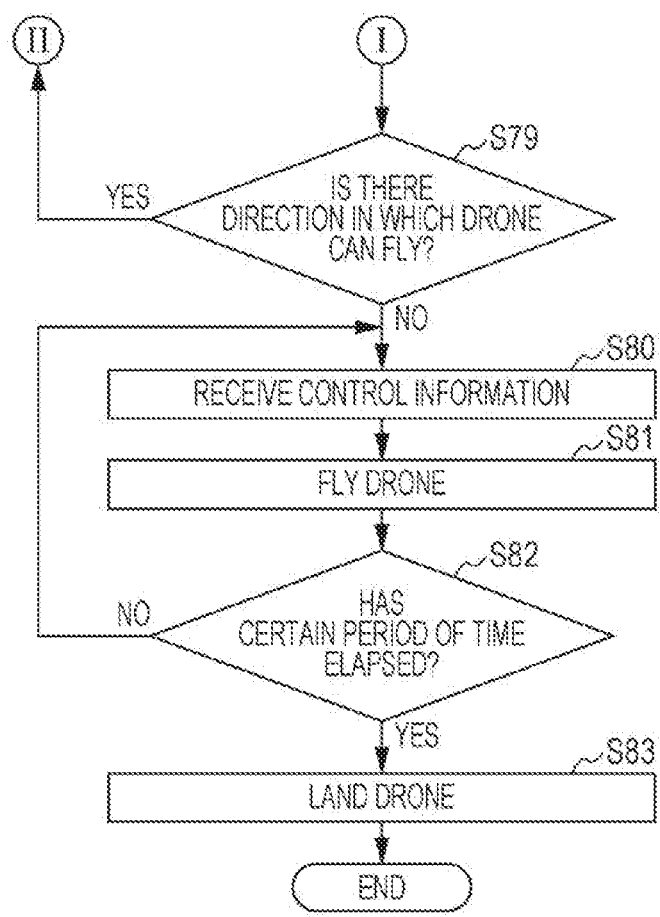
FIG. 32 is a second flowchart illustrating the process for controlling the flight of a drone according to the seventh embodiment.

FIG. 31 is a first flowchart illustrating the process for controlling the flight of the drone 1 according to the seventh embodiment. FIG. 32 is second flowchart illustrating the process for controlling the flight of the drone 1 according to the seventh embodiment.

Steps S71 to S78 are the same as steps S61 to S68, respectively, illustrated in FIG. 28, and description thereof is omitted.

Next, in step S79, the flight stop cancelation section 43 determines whether there is a direction at the current position in which the drone 1 can fly.

Figure 33:
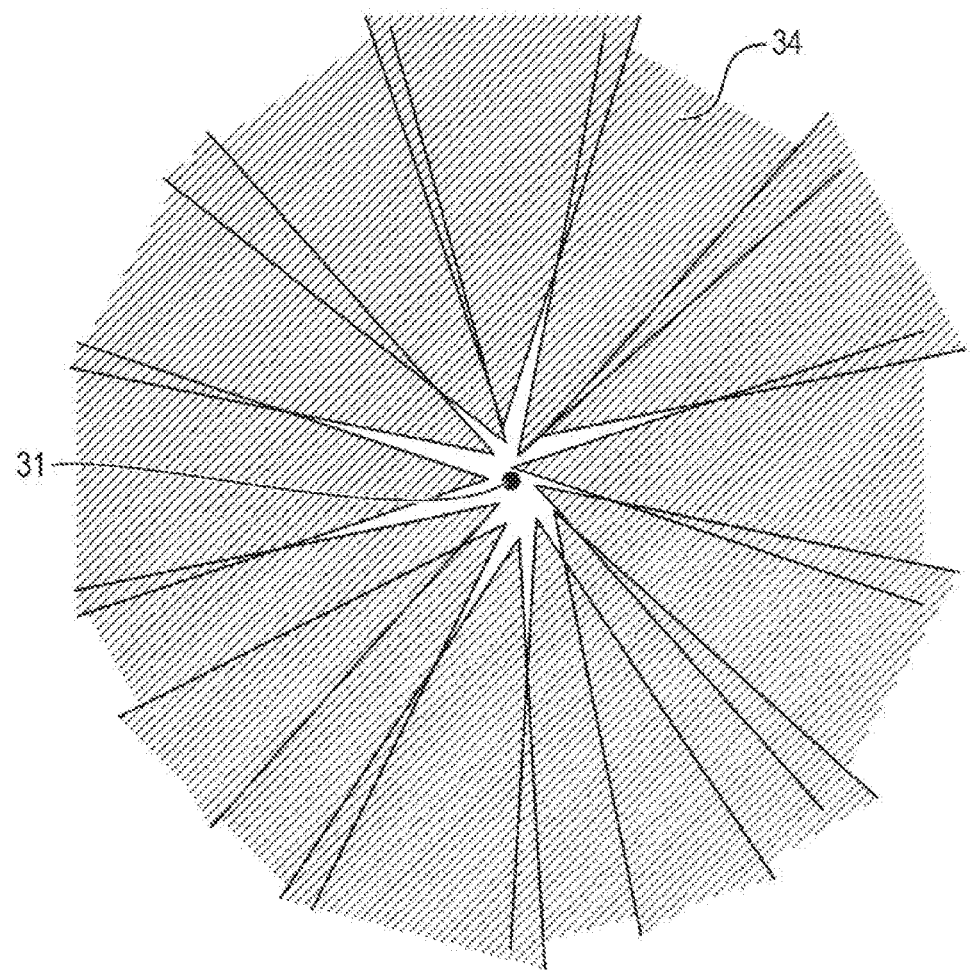
FIG. 33 is a schematic diagram illustrating flight prohibition areas according to the seventh embodiment.

FIG. 33 is a schematic diagram illustrating flight prohibition areas according to the seventh embodiment. As illustrated in FIG. 33, because a plurality of flight impossible directions have been stored in the flight impossible direction storage section 42, there are flight prohibition areas 34 in all directions of the drone 1 at a current position 31 on a horizontal plane. In this case, the flight stop cancelation section 43 determines that there is no direction at the current position 31 in which the drone 1 can fly. If there is any direction of the drone 1 in which a flight prohibition area does not exist, on the other hand, the flight stop cancelation section 43 determines that there is a direction at the current position 31 in which the drone 1 can fly.

In FIG. 32, if there is a direction at the current position in which the drone 1 can fly (YES in step 379), the process returns to step S71.

If there is no direction at the current position in which the drone 1 can fly (NO in step S79), on the other hand, the first communication unit 104, in step S80, receives control information transmitted from the controller 2.

Next, in step S81, the flight stop cancelation section 43 cancels the inhibition on the drone 1 and flies the drone 1 in accordance with the control information received by the first communication unit 104. That is, the flight stop cancelation section 43 receives a flight instruction to the drone 1 transmitted through the remote control performed by the operator 3. At this time, the drone 1 can fly in any direction regardless of the flight impossible directions stored in the flight impossible direction storage section 42.

Next, in step S82, the flight stop cancelation section 43 determines whether the certain period of time has elapsed since the inhibition on the drone 1 is canceled. That is, if illuminances in all the directions of the drone 1 do not satisfy the required illuminance, the flight stop cancelation section 43 does not allow the drone 1 to fly in any direction without any restriction but allows the drone 1 to fly in any direction for a period of time taken by the drone 1 to return to a position of the operator 3 or the flight start position.

Here, if the certain period of time has not yet elapsed (NO in step S82), the process returns to step S80.

If the certain period of time has already elapsed (YES in step S82), on the other hand, the flight stop cancelation section 43, in step S83, forcibly lands the drone 1 at the current position.

As described above, if a detected illuminance does not satisfy the required illuminance, a flight impossible direction is associated with positional information and stored. As a result, a plurality of flight impossible directions in which the drone 1 does not fly can be accumulated. If there are flight prohibition areas in all directions of the drone 1, the drone 1 is temporarily allowed to fly in any direction. If it is difficult for the operator 3 to visually observe the drone 1, therefore, the drone 1 can fly in any direction for a certain period of time, and it becomes possible to prevent the drone 1 from being stuck.

In the seventh embodiment, the control unit 105 may include the notification control section 14, and the drone 1 may notify the controller 2 that there is no direction in which the drone 1 can fly.

Although the flight determination section 12 determines whether an illuminance detected by the illuminance sensor 101 on the drone 1 satisfies the required illuminance in the first to seventh embodiments, the present disclosure is not particularly limited to this. The drone 1 may obtain an illuminance detected by an illuminance sensor provided outside the drone 1, and the flight determination section 12 may determine whether the illuminance obtained from the outside of the drone 1 satisfies the required illuminance, instead.

In the first to seventh embodiments, the flight determination section 12, the flight stop control section 13 or 41, the notification control section 14, the turnaround control section 15, the return control section 16 or 18, the flight stop cancelation section 43, and the storage unit 107 may be included not in the drone 1 but in the controller 2, instead. In this case, information detected by the illuminance sensor 101, the position sensor 108, and the like of the drone 1 may be transmitted to the controller 2, and the controller 2 may transmit a signal for controlling the flight of the drone 1 to the drone 1 on the basis of the information from the drone 1.

In addition, in the first to seventh embodiments, the flight determination section 12, the flight stop control section 13 or 41, the notification control section 14, the turnaround control section 15, the return control section 16 or 18, the flight stop cancelation section 43, and the storage unit 107 may be included not in the drone 1 but in a server communicably connected to the drone 1, instead.

In the present disclosure, some or all of the units, the devices, the members, and the sections, or some or all of the function blocks illustrated in the block diagrams of FIGS. 3, 4, 7, 8, 12, 17, 22, 26, and 30, may be achieved by one or more electronic circuits including a semiconductor device, a semiconductor integrated circuit (IC), or a large-scale integration (LSI) circuit. The LSI circuit or the IC may be achieved on a single chip, or may be obtained by combining a plurality of chips, For example, the function blocks other than the storage devices may be integrated on a single chip. Although the terms "LSI" and "IC" are used here, a term "system LSI", "very-large-scale integration (VLSI)", or "ultra-large-scale integration (VLSI)" may be used, instead, depending on a degree of integration. A field-programmable-gate array (FPGA), which can be programmed after an LSI circuit is fabricated, or a reconfigurable logic device, in which connections inside an LSI circuit can be reconfigured or circuit sections inside the LSI circuit can be set up, may be used for the same purpose.

Furthermore, some or all of the functions or the operations of the units, the devices, the members, and the sections may be achieved through a software program. In this case, the software program is stored in one or more non-transitory recording media such as read-only memories (ROMs), optical discs, or hard disk drives, and the functions specified by the software program are executed by a processor and peripheral devices when the processor executes the software program. A system or an apparatus may include one or more non-transitory recording media storing the software program, the processor, and a necessary hardware device, such as an interface, A drone, a method for controlling the flight of a drone, and a program for controlling the flight of a drone in the present disclosure can prevent the drone from flying into a place where it is difficult for an operator to visually observe the drone and fly the drone within an area in which the operator can visually observe the drone. The drone, the method for controlling the flight of a drone, and the program for controlling the flight of a drone in the present disclosure are effective as a remotely controlled drone, a method for controlling the flight of a remotely controlled drone, and a program for controlling the flight of a remotely controlled drone, respectively.

What is claimed is:

1. A drone comprising:
a detector that detects an illuminance in a flight direction of the drone;
a communicator that communicates with a controller used to remotely control the drone;
a driver that flies the drone; and
circuitry that, in operation, performs operations including
determining whether the detected illuminance satisfies an illuminance requirement for the drone to fly, and
inhibiting, if the detected illuminance does not satisfy the illuminance requirement, the drone from flying in the flight direction.

2. The drone according to claim 1,
wherein the operations further include
flying, if the detected illuminance does not satisfy the illuminance requirement, the drone in a direction different from the flight direction.

3. The drone according to claim 1, further comprising:
a storage that stores a flight start position, which indicates a position at which the drone started to fly,
wherein the operations further include
flying, if the detected illuminance does not satisfy the illuminance requirement, the drone to the flight start position stored in the storage to return the drone to the flight start position.

4. The drone according to claim 1, further comprising:
a storage,
wherein the operations further include
obtaining, if the detected illuminance does not satisfy the illuminance requirement, a current position of the drone,
storing, as a flight impossible direction, the flight direction at the obtained current position in the storage while associating the flight direction with positional information indicating the obtained current position, and
inhibiting the drone from flying into a certain flight prohibition area including the flight impossible direction at the position indicated by the positional information stored in the storage.

5. The drone according to claim 4,
wherein the operations further include
allowing, if there is the flight prohibition area in all directions of the drone at the position indicated by the positional information stored in the storage, the drone to fly through remote control performed by an operator.

6. The drone according to claim 1,
wherein the operations further include
transmitting, if the detected illuminance does not satisfy the illuminance requirement, notification information indicating that the drone does not fly in the flight direction to the controller.

7. A method for controlling flight of a drone, the method comprising:
detecting an illuminance in a flight direction of the drone using an illuminance sensor included in the drone;
determining whether the detected illuminance satisfies an illuminance requirement for the drone to fly; and
inhibiting, if the detected illuminance does not satisfy the illuminance requirement, the drone from flying in the flight direction.

8. A non-transitory computer-readable recording medium storing a program for controlling flight of a drone, the program causing a computer to perform a method comprising:
determining whether an illuminance in a flight direction of the drone satisfies an illuminance requirement for the drone to fly; and
inhibiting, if the detected illuminance does not satisfy the illuminance requirement, the drone from flying in the flight direction.

* * * * *